US012169939B2

(12) United States Patent
Alvarez-Valle et al.

(10) Patent No.: US 12,169,939 B2
(45) Date of Patent: Dec. 17, 2024

(54) REFINEMENT OF IMAGE SEGMENTATION

(71) Applicant: Microsoft Technology Licensing, LLC, Redmond, WA (US)

(72) Inventors: Javier Alvarez-Valle, Cambridge (GB); Richard W. Lowe, Cambridge (GB)

(73) Assignee: Microsoft Technology Licensing, LLC., Redmond, WA (US)

( * ) Notice: Subject to any disclaimer, the term of this patent is extended or adjusted under 35 U.S.C. 154(b) by 292 days.

(21) Appl. No.: 17/782,208

(22) PCT Filed: Nov. 27, 2020

(86) PCT No.: PCT/US2020/062468
§ 371 (c)(1),
(2) Date: Jun. 3, 2022

(87) PCT Pub. No.: WO2021/113149
PCT Pub. Date: Jun. 10, 2021

(65) Prior Publication Data
US 2023/0032702 A1 Feb. 2, 2023

(30) Foreign Application Priority Data
Dec. 6, 2019 (EP) .................................... 19214225

(51) Int. Cl.
*G06T 7/194* (2017.01)
*G06T 7/187* (2017.01)

(52) U.S. Cl.
CPC .............. *G06T 7/194* (2017.01); *G06T 7/187* (2017.01); *G06T 2200/04* (2013.01); *G06T 2207/10081* (2013.01); *G06T 2207/20108* (2013.01)

(58) Field of Classification Search
None
See application file for complete search history.

(56) References Cited

U.S. PATENT DOCUMENTS 6,891,966 B2 * 5/2005 Chen .......................... G06T 7/12
382/173
8,031,919 B2 * 10/2011 Eskildsen ............... G06T 7/149
382/128

(Continued)

FOREIGN PATENT DOCUMENTS

EP 2736016 A2 5/2014
WO 0126050 A2 4/2001

(Continued)

OTHER PUBLICATIONS

"Five-Minute Overview of the InnerEye Research Project", Retrieved from: https://www.microsoft.com/en-us/research/video/five-minute-overview-innereye-research-project/, Sep. 22, 2016, 5 Pages.

(Continued)

*Primary Examiner* — Anand P Bhatnagar
(74) *Attorney, Agent, or Firm* — Barta Jones, PLLC

(57) ABSTRACT

A computer-implemented method comprising: receiving a 3D image including an object depicted in the image, the 3D image comprising an ordered set of 2D images; determining a contour around the object in a first of said 2D images; and determining a contour around the object in a second of said 2D images, the second 2D image being non-contiguous with the first in said ordered set, having an intermediate region comprising one or more intermediate ones of said 2D images between the first and second 2D images within said ordered set. In each of the first and second 2D images, inside of the contour is classified as foreground and outside of the contour is classified as background. The method further comprises performing a 3D geodesic distance computation to classify points in the intermediate region as foreground of background.

15 Claims, 19 Drawing Sheets

(56) References Cited

U.S. PATENT DOCUMENTS

| | | | |
|---|---|---|---|
| 10,217,203 B2* | 2/2019 | Jeon | G06T 5/50 |
| 10,235,605 B2 | 3/2019 | Criminisi et al. | |
| 11,379,985 B2* | 7/2022 | Wang | G06N 3/08 |
| 2003/0091225 A1* | 5/2003 | Chen | G06V 10/10 |
| | | | 382/145 |
| 2006/0013482 A1* | 1/2006 | Dawant | G06T 7/149 |
| | | | 382/128 |
| 2008/0069445 A1* | 3/2008 | Weber | G06T 7/149 |
| | | | 382/181 |
| 2008/0170791 A1* | 7/2008 | Eskildsen | G06T 7/12 |
| | | | 382/199 |
| 2008/0260221 A1 | 10/2008 | Unal et al. | |
| 2016/0093110 A1* | 3/2016 | Waschbusch | G06T 19/00 |
| | | | 382/131 |
| 2020/0167930 A1* | 5/2020 | Wang | G06N 3/08 |

FOREIGN PATENT DOCUMENTS

| | | |
|---|---|---|
| WO | 2018108569 A1 | 6/2018 |
| WO | 2019092167 A1 | 5/2019 |

OTHER PUBLICATIONS

"Research in Focus: Project InnerEye—Assistive AI for Cancer Treatment", Retrieved from: https://www.youtube.com/watch?v=jaFTXi56bFI, Jul. 18, 2017, 16 Pages.

"Tech Showcase: Project InnerEye—Assistive AI for Cancer Treatment", Retrieved from: https://www.youtube.com/watch?v=V0oYUBvkP0A, Oct. 2, 2017, 3 Pages.

"Using Adobe Photoshop CS4", Retrieved From: https://help.adobe.com/archive/en_US/photoshop/cs4/photoshop_cs4_help.pdf, Oct. 1, 2010, pp. 254-256.

"Extended Search Report Issued In European Patent Applicaton No. 19214225.5", Mailed Date: May 19, 2020, 9 Pages.

"Extended Search Report Issued In European Patent Applicaton No. 19214232.1", Mailed Date: May 12, 2020, 9 pages.

Criminisi, et al., "GeoS: Geodesic Image Segmentation", In Proceedings of the 10th European Conference on Computer Vision, Part I, Oct. 20, 2008, pp. 99-112.

Criminisi, Antonio, "Project InnerEye—Medical Imaging AI to Empower Clinicians", Retrieved from: https://www.microsoft.com/en-us/research/uploads/prod/2017/12/Project-InnerEye-RSNA-2017-11-28.pptx, Retrieved on Dec. 6, 2012, 46 Pages.

Fleming, Lindsay, "TeraRecon Demonstrates Project InnerEye Radiomics Powered by EnvoyAI", Retrieved from: https://www.terarecon.com/blog/terarecon-demonstrates-project-innereye-radiomics-powered-by-envoyai, Mar. 7, 2018, 5 Pages.

Hancock, Matt, "My Vision for a More Tech-Driven NHS", Retrieved from: https://www.matt-hancock.com/news/my-vision-more-tech-driven-nhs, Sep. 6, 2018, 11 Pages.

Lee, Peter, "Microsoft's Focus on Transforming Healthcare: Intelligent Health Through AI and the Cloud", Retrieved from: https://blogs.microsoft.com/blog/2018/02/28/microsofts-focus-transforming-healthcare-intelligent-health-ai-cloud/, Feb. 28, 2018, 8 Pages.

Linn, Allison, "How Microsoft Computer Scientists and Researchers are Working to 'Solve' Cancer", Retrieved from: http://news.microsoft.com/stories/computingcancer/, Retrieved on Dec. 12, 2019, 23 Pages.

Lynch, Gerald, "From Kinect to InnerEye—How Microsoft is Supercharging Gaming Tech with AI Smarts to Help Diagnose Cancer", Retrieved from: https://www.techradar.com/news/from-kinect-to-innereye-how-microsoft-is- supercharging-gaming-tech-with-ai-smarts-to-help-diagnose-cancer, May 9, 2017, 7 Pages.

"International Search Report and Written Opinion Issued in PCT Application No. PCT/US20/062468", Mailed Date: Mar. 2, 2021, 14 Pages.

"International Search Report and Written Opinion Issued in PCT Application No. PCT/US20/062470", Mailed Date: Mar. 3, 2021, 17 Pages.

Sample, Ian, "'It's going to create a revolution': how AI is transforming the NHS", Retrieved from: https://www.theguardian.com/technology/2018/jul/04/its-going-create-revolution-how-ai-transforming-nhs, Jul. 4, 2018, 5 Pages.

Sample, Ian, "Joseph Stiglitz on artificial intelligence: 'We're going towards a more divided society'", Retrieved from: https://www.theguardian.com/technology/2018/sep/08/joseph-stiglitz-on-artificial-intelligence-were-going-towards-a-more-divided-society, Sep. 8, 2018, 6 Pages.

Schenk, et al., "Efficient Semiautomatic Segmentation of 3D Objects in Medical Images", In Proceedings of International Conference on Medical Image Computing and Computer-Assisted Intervention, Oct. 11, 2000, pp. 186-195.

* cited by examiner

REFINEMENT OF IMAGE SEGMENTATION

BACKGROUND

Image segmentation involves assigning labels to elements classifying whether they belong to the 'foreground' (the element to label), or 'background' (the elements to be excluded from the label). An example would be to outline all the cars on an image of a street. Aspects of the cars would be marked as 'foreground', and the street road, signs, houses, would be marked as 'background'. Another example would be to segment a medial scan, such as to outline as foreground an organ or tumour in the image.

An example of automated image segmentation is disclosed in U.S. Pat. No. 10,235,605. This uses the concept of 'geodesic distance' between points in the image. Geodesic distance is a measure of distance that takes into account one or more parameters in the image, such as pixel intensity. The intensity could be thought of like the height on a map: the shortest distance between two points might be to go around a hill rather than over it. In other words, the measure of distance is weighted by the intensity (or other such parameter) of the pixels or points along the route. Pixels, or voxels in a 3D image, can be passed into the geodesic distance algorithm to compute a resulting foreground segmentation.

SUMMARY

According to one aspect disclosed herein, there is provided a computer-implemented method comprising: receiving a 3D image including an object depicted in the image, the 3D image comprising an ordered set of 2D images; determining a contour around the object in a first of said 2D images; and determining a contour around the object in a second of said 2D images. The second 2D image is non-contiguous with the first in said ordered set, having an intermediate region comprising one or more intermediate ones of said 2D images between the first and second 2D images within the order of said set. In each of the first and second 2D images, inside of the contour is classified as foreground and outside of the contour is classified as background. The method further comprises performing a 3D geodesic distance computation to classify points in between in the intermediate region as either foreground of background.

The 3D geodesic distance computation comprises, for each of a plurality of points in the intermediate region: computing a shortest foreground distance being a shortest 3D geodesic distance from the point to the foreground, and computing a shortest background distance being a shortest 3D geodesic distance from the point to the background; and classifying the point as foreground if the shortest foreground distance is shorter the shortest background distance, but classifying the point as background if the shortest background distance is shorter than the shortest foreground distance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Figure 1:
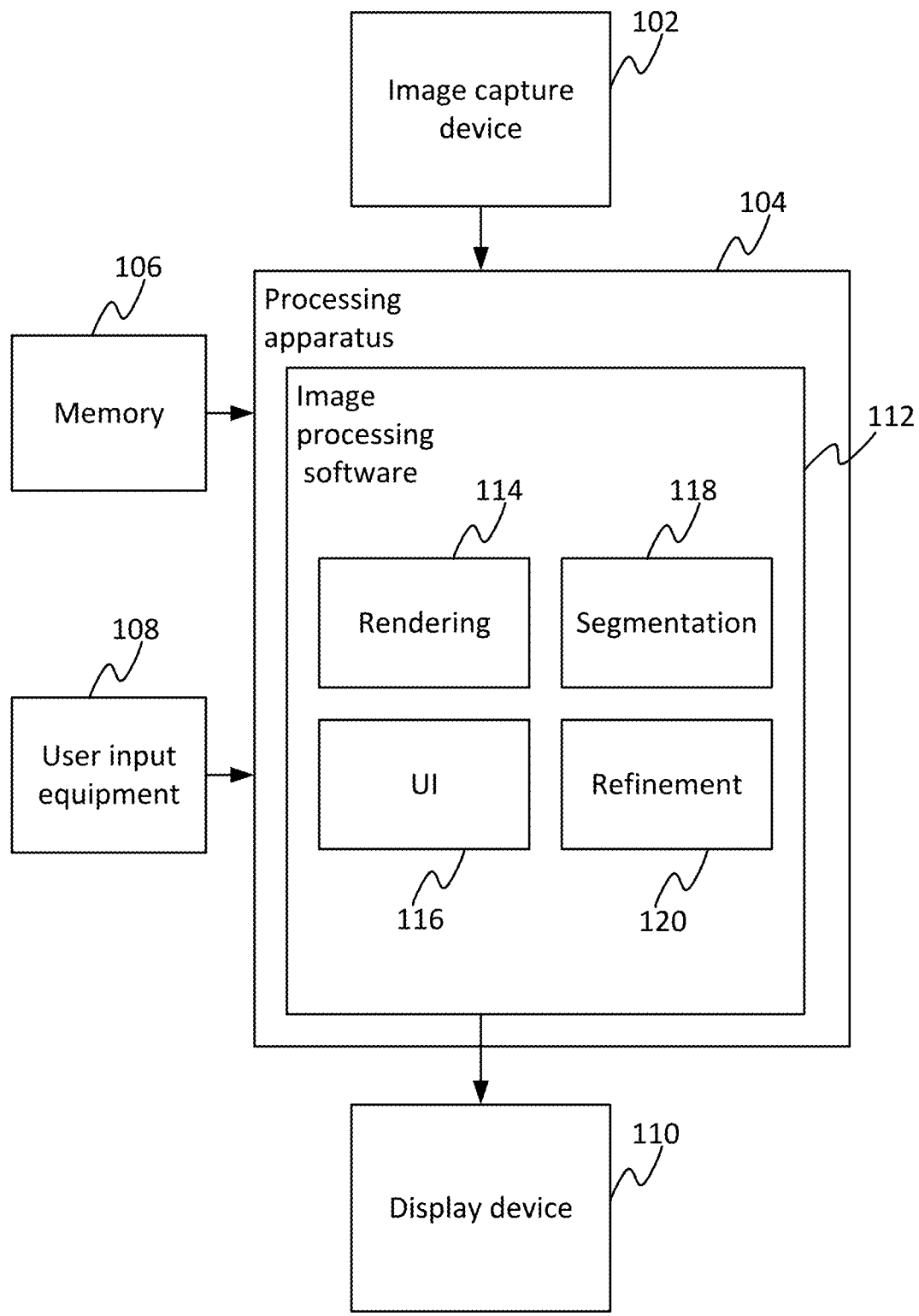
FIG. 1 is a schematic block diagram of a system for segmenting an image.

The following describes a system and method for 2D and 3D computation of geodesic features for segmenting 3D images, such as for user driven image labelling of 3D images. A 3D image is an image comprising an ordered set of 2D images, which in the case of a static 3D image comprises a stack of 2D image "slices" through a volume. For instance, an example of 3D labelling would be to segment tissue in a 3D medical image scan, e.g. outline the bladder in a CT (computerized tomography) image.

It would be desirable to allow for a 3D segmentation of an image without a user having to manually segment or manually refine the segmentation of each individual 2D image slice in the stack, but whilst still providing a result that is approximately consistent with the user's expectation. To achieve this, the following utilises a geodesic distance algorithm with a novel approach of mixing 2D and 3D calculations.

In embodiments, the algorithm will only compute geodesic distances between 'locked' 2D slices. Each 'locked' 2D slice is computed using a 2D geodesic distance calculations, and then the 3D computation is only computed on the non-locked 2D slices as one 3D computation. As most 3D images are labelled in 2D on a computer screen, it would be preferable to enable this in a manner that avoids inconsistent or unexpected behaviour in the 'off-screen' 2D slices.

As an optional optimization, if the user modifies one of the 2D slices, the algorithm does not require a full 3D computation on every modification of the 'foreground' and 'background' labels.

In operation of the algorithm, a user may begin on an arbitrary 2D slice of a 3D image. He or she begins by marking either foreground or background regions in the 2D image slice. Once completed, a geodesic distance algorithm is used to segment the proposed foreground area on only the 2D slice the user has interacted with. No 3D computation is executed on the rest of the image stack at this stage. This results in a complete 2D segmentation that the user expects in one slice. E.g. see FIG. 12A.

The user will next go to another 2D slice, either adjacent or multiple slices away from the first 2D slice. The same user interaction is repeated, marking foreground and/or background regions to complete a 2D segmentation of the current interacted slice. The outcome of this segmentation can be immediately presented to the user, and again, should match the user's expectation of the 2D segmentation.

Now that two 2D slices have been interacted with, an automated 3D geodesic distance computation is performed between the marked slices. In embodiments, this is done by converting the interacted 2D slices into a brush map of only foreground and background. If a pixel is within any of the 2D segmentations, it is marked as foreground, otherwise every other pixel on the interacted 2D slices are marked as background. This gives the geodesic distance algorithm a strong signal of the areas the user has interacted with. This approach also effectively 'locks' the interacted slices in place. The geodesic distance algorithm attempts to find segmentations on non-marked voxels. However, as all voxels have been marked on the 2D slices, the resulting segmentation will not change.

The user may then have at least two further options. One is to interact with a new, non-segmented 2D slice above or below the interacted slices. Or at the other option, the user could choose to make modifications to the 3D segmentation on non-interacted slices. If the user chooses to interact with a new slice, the above is repeated, and a 3D computation is calculated between the closest interacted 2D slice and the new 2D slice. E.g. see FIG. 12B.

As an optional optimisation, the algorithm does not compute a full 3D geodesic distance computation between the top-most and bottom-most slices as the computation will produce the same result. Rather, it only needs to re-compute between the last interacted slice and the closest 'locked' 2D slice.

If a modification is made to a 2D slice between two interacted 2D slices, a 2D computation is again computed on the interacted slice. However, two 3D computations will be calculated between this slice and the interacted slice above and below. In embodiments run on multi-core computers, both 3D computations could be run in parallel to negate the cost of running two 3D computations.

In embodiment, such utilisations of the geodesic distance algorithm may be exploited to provide any one or more of the following advantages or similar: I) the user does not need to review slices that are "locked" because the algorithm warranties that they never change, saving time to the user; II) an expected outcome of 3D segmentation based on previous user interactions; III) immense computation speed up and efficiency by only computing in 2D first (allowing the user to have instant feedback on the outcome of interactions); IV) 3D computation is sped up and made more efficient by only computing the 3D segmentation between 'locked' 2D slices.

FIG. 1 gives a block diagram of an example system for implementing the techniques disclosed herein. The system comprises an image capture device 102, processing apparatus 104, memory 106, user input equipment 108 and a display device 110. Each of the image capture device 102, memory 106, user input equipment 108 and display device 110 is operatively coupled to the processing apparatus 104.

The image capture device 102 may for example take the form of a still-image camera, video camera, or a medical scanner such as an X-ray camera, magnetic resonance imaging (MRI) scanner, computed tomography (CT) scanner, positron emission tomography (PET) scanner, ultrasound scanner etc. It is configured to capture a 3D image, which may be a static 3D image comprising a stack of 2D images through a volume, or a video image comprising a series of 2D frames. Whatever form the images takes, the image capture device 103 is arranged to provide the captured image to the processing apparatus 104. The image may be stored a region of the memory 106 and accessed by the processing apparatus 104 via the memory 106. It will be appreciated that the arrangement shown in FIG. 1 is somewhat schematised.

The processing apparatus 104 comprises one or more processing units implemented in one or more dies, IC (integrated circuit) packages and/or housings at one or more geographic sites. The memory 106 comprises one or more memory units implemented in one or more memory media in one or more housings at one or more geographic sites. The memory unit(s) may or may not be incorporated in the same housing(s) as the processing units(s). Where required, distributing storage and/or computing techniques are known in the art. For instance, multiple processing units and/or memory units could be networked together via a network such as a local area network (e.g. within a building such as a hospital) and/or a wide area network or internetwork such as the Internet. Alternatively the processing apparatus 104 and/or memory 106 could all be integrated into the same housing of the same computer terminal.

Either way, each of the one or more processing units may take any suitable form known in the art, e.g. a general purposes central processing unit (CPU), or a dedicated form of co-processor or accelerator processor such as graphics processing unit (GPU), digital signal processor (DSP), etc. Each of the one or more processing units may comprise one or more cores. Each of the one or more memory units may employ any suitable storage medium known in the art, e.g. a magnetic storage medium such as a hard disk drive, magnetic tape drive etc.; or an electronic storage medium such as a solid state drive (SSD), flash memory or EEPROM, etc.; or an optical storage medium such as an optical disk drive or glass or memory crystal based storage, etc. Where it is said herein that some item of data is stored in memory 106 or a region thereof, this may mean stored in any part of any one or more memory devices making up the memory 106. Where it is said that software is run on the processing apparatus, this mean may run on any one or more processing units making up the processing apparatus 104.

The user input equipment 108 may comprise any one or more suitable input devices for known in the art for receiving inputs from a user. In embodiments it comprises at least one pointing device that enables the user to draw in an image rendered in the display 110, such as a mouse, stylus, touchscreen, trackpad and/or trackball. Alternatively or additionally, the user input equipment 108 may comprise one or more other input devices such as a keyboard or voice control means. Where reference is made herein to receiving an input from the user through the user input equipment 108, this may mean through any one or more user input devices making up the user input equipment 108. The user input device(s) may or may not be incorporated into the same housing(s) as the processing unit(s) of the processing apparatus 104.

The display device 110 may take any suitable form for outputting images, such as an LED screen, LCD (liquid crystal display), plasma screen, electric ink display, or a traditional cathode ray tube. In embodiments, optionally it may take the form of a touchscreen and thus also form at least part of the user input equipment 108. The touchscreen may enable inputs by via being touched by the user's finger and/or using a stylus. The display device 110 may or may not be incorporated into the same housing(s) as the processing unit(s) of the processing apparatus 104.

The system further comprises image processing software 112 comprising a rendering module 114, UI (user interface) module 116, a segmentation module 118 and a refinement module 120. The image processing software 112, including each of these modules 114, 116, 118, 120, is implemented in the form of software code stored in the memory 106 and arranged to run on the processing apparatus 104. The modules of code 114, 116, 118, 120 are configured so as when thus run to perform the various operations related to, respectively: rendering images on the display 110, enabling the user to interact with the images by means of one or more UI tools such as brush tool, segmenting the image, and refining the segmentation.

Figure 2:
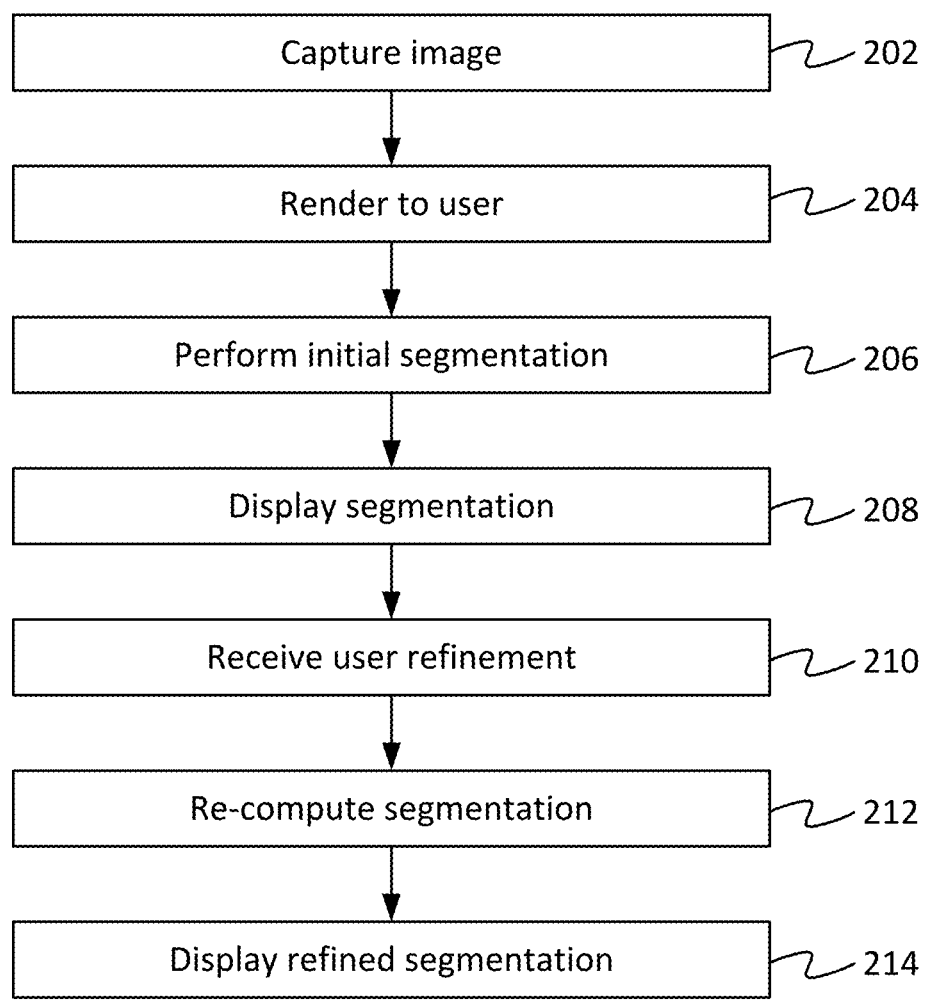
FIG. 2 is a flow chart of a method of segmenting a 2D image slice.

FIG. 2 gives a flow chart of a method of determining a contour around an object in a 2D image, such as a 2D slice through a volume. The method begins at step 202 with capturing the 2D image via the image capture device 102. The captured image is provided to the processing apparatus 104 for processing. This may comprise storing the captured image in memory 106, and the processing may comprise processing the stored image from memory 106. At step 204, the rendering module 114 run on the processing apparatus 104 renders the captured image to the user through the display device 110. At step 206, the segmentation module 118 performs an initial segmentation of the image into at least one foreground object and a background region. The segmentation comprises determining a contour around the object, as will be discussed in more detail shortly. For the present purposes a "contour" means an outline around the full perimeter of the object. The segmentation may be performed in a full automaticity manner, or in a partially automated manner based on user inputs received from the user, or in a completely manual fashion based on user inputs input from the user. Any such user inputs are received through the user input equipment 108 via the UI module 116. At step 208 the rendering module 114 outputs the contour determined by the segmentation module 118 through the display 110.

At step 210 the UI module 116 receives a user input from the user through the user input equipment 108 in order to refine the contour that was initially determined by the segmentation module 118. In accordance with the present disclosure, this comprises the user re-drawing a part of the contour, e.g. using a brush tool as will be discussed in more detail shortly. At step 212 the refinement module 120 re-computes the contour based on the user input received via the UI module 116 through the user input equipment 108. At step 214 the rendering module 114 outputs the re-computed contour determined by the refinement module 120 through the display 110.

FIGS. 3A to 3E illustrate a method for the initial segmentation of a segmentation of the image as may be performed at step 206, for example. The method is performed by the segmentation module 118 based on user inputs received from a user through the user input equipment 114, using a UI tool provided by the UI module 116. It will be appreciated that the particular image shown in FIGS. 3A to 3E is just given by way of illustration and is not limiting.

Figure 3A:
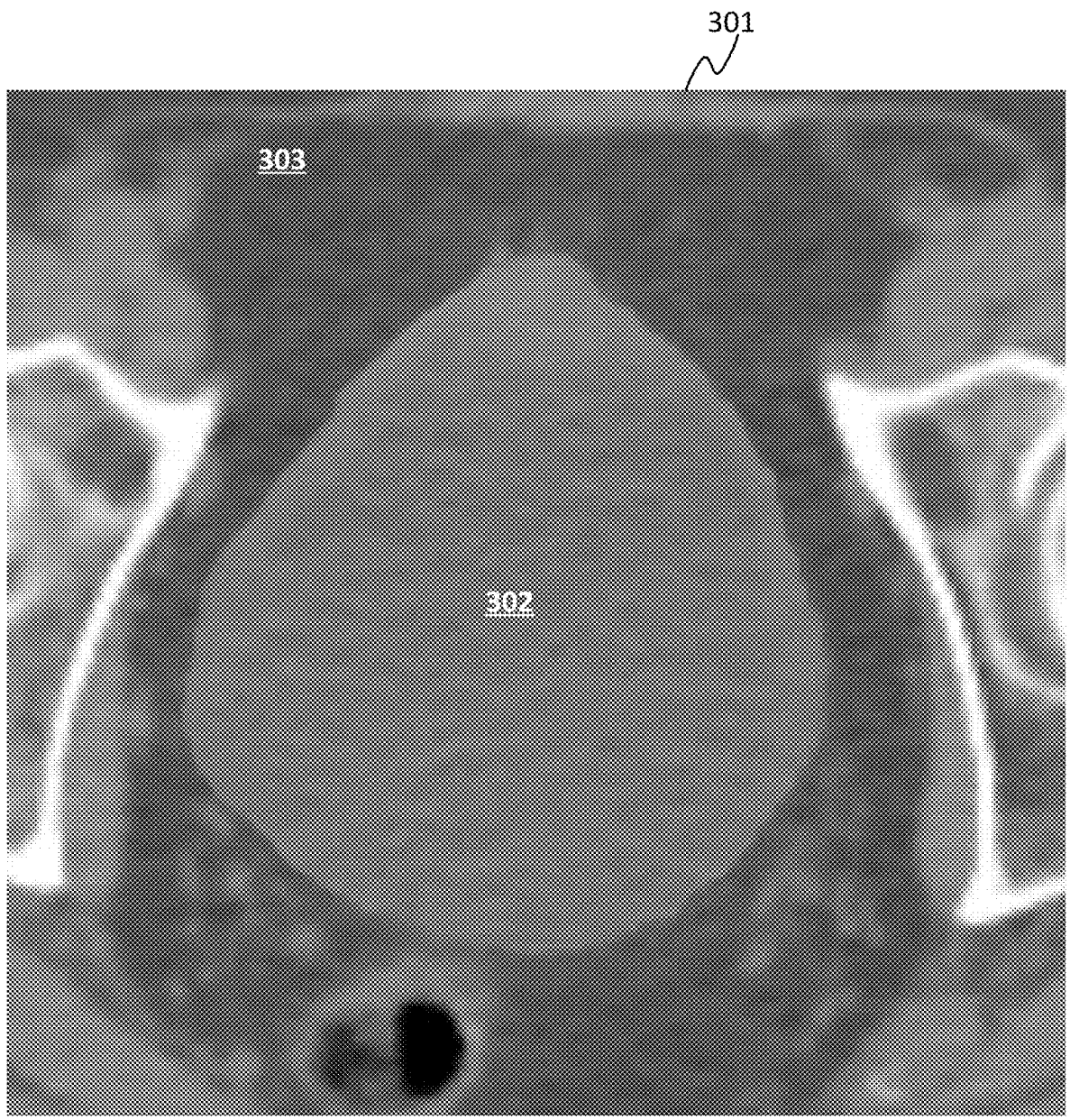
FIGS. 3A to 3E illustrate an example process for segmenting a 2D image slice.

FIG. 3A shows the captured image without segmentation, e.g. as initially captured at step 202 and displayed at step 204. The image comprises an (as-yet unsegmented) object 302, and a background region 303 outside the object 302. In this example the image is a medical scan through the pelvis and the object 302 is the bladder.

Figure 3B:
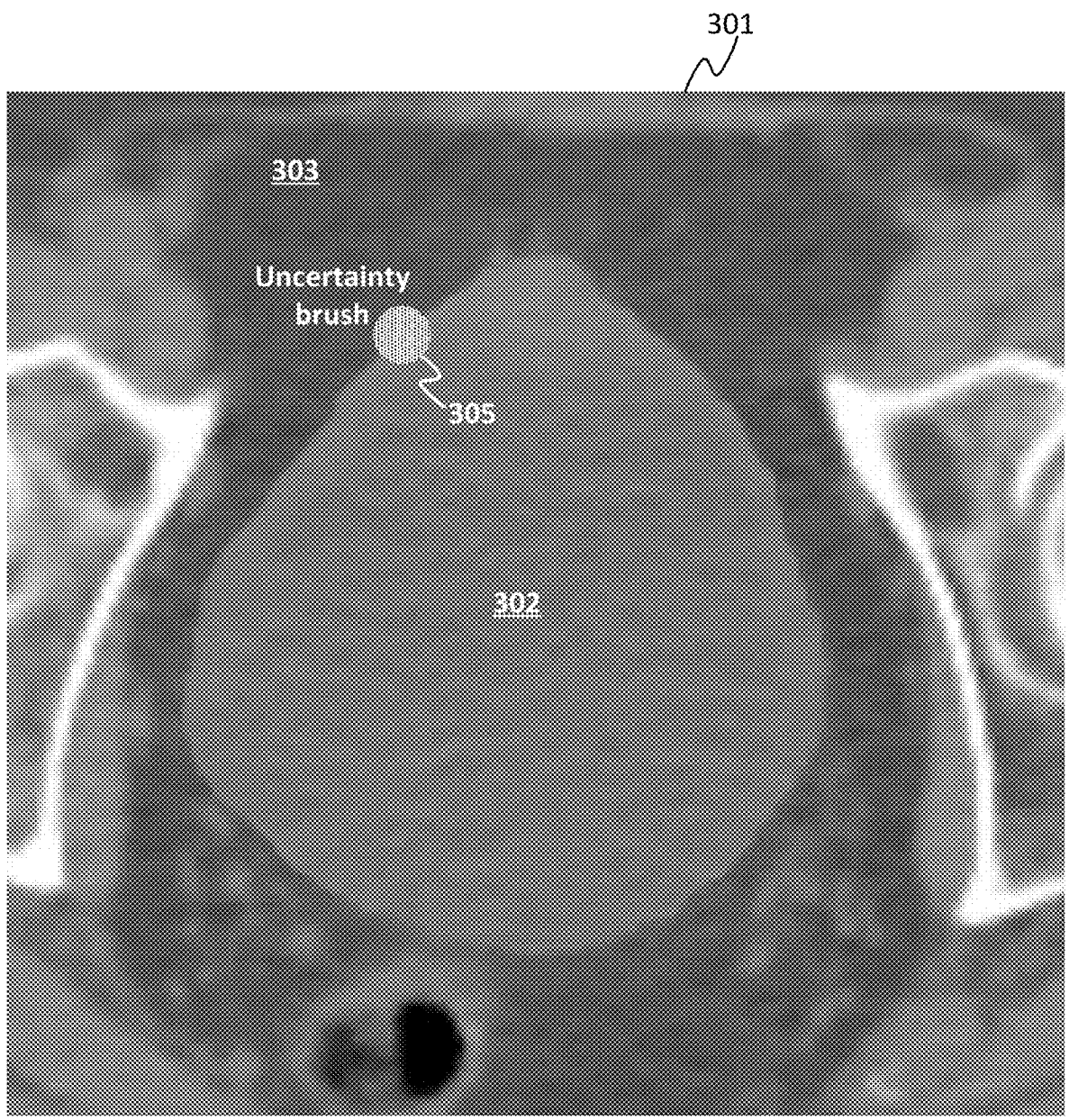

FIG. 3B illustrates an example of the UI drawing tool 305 that may be provided by the UI module 116. In this case the tool 305 takes the form of a brush tool referred to herein as an "uncertainty brush". A brush tool is a drawing tool having a finite (non-zero) width or area, i.e. a non-pointlike tool, larger than a single point or pixel.

Figure 3C:
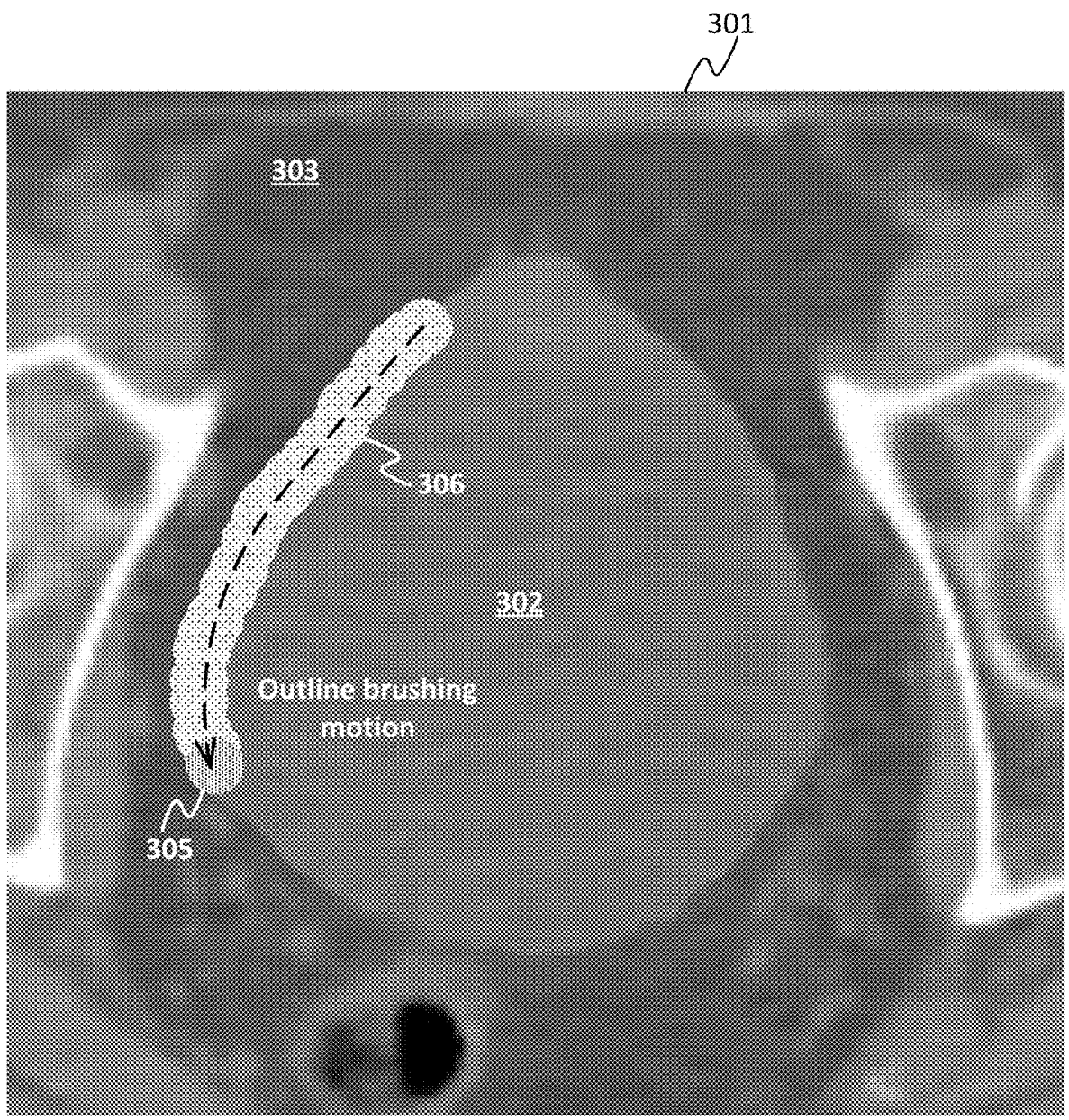

FIG. 3C illustrates the use of the uncertainty brush 305. The user uses the uncertainty brush tool 305 to brush a region of uncertainty 306 around the perimeter of the object 302, e.g. using a mouse in a point-and-click interface, or a finger or stylus on a touch screen. The brush tool 305 leaves behind a trail in the form of a region of uncertainty 306 superposed on the image everywhere it is brushed.

Figure 3D:

FIG. 3D shows the situation once the user has brushed around the whole perimeter of the object 302. The region of uncertainty 306 thus forms a complete loop around the object 302, the loop having a finite width (wider than a line).

The region of uncertainty 306 defines a region that could be either be foreground or background. The segmentation module 118 automatically classifies the region outside of the loop formed by the region of uncertainty 306 as known background, the region inside loop formed by the region of uncertainty 306 as known foreground, and the area of region of uncertainty itself 306 as to-be-determined (currently unknown). For instance this may be implemented by determining a pixel mask over the image, where each pixel outside the loop defined by the region of uncertainty 306 is mapped to a first value (e.g. 1) indicating background 303, each pixel inside the loop defined by the region of uncertainty 306 is mapped to a second value (e.g. 0) indicating foreground 302, and each pixel in the region of uncertainty 306 itself is mapped to a third value indicating uncertainty.

Figure 3E:
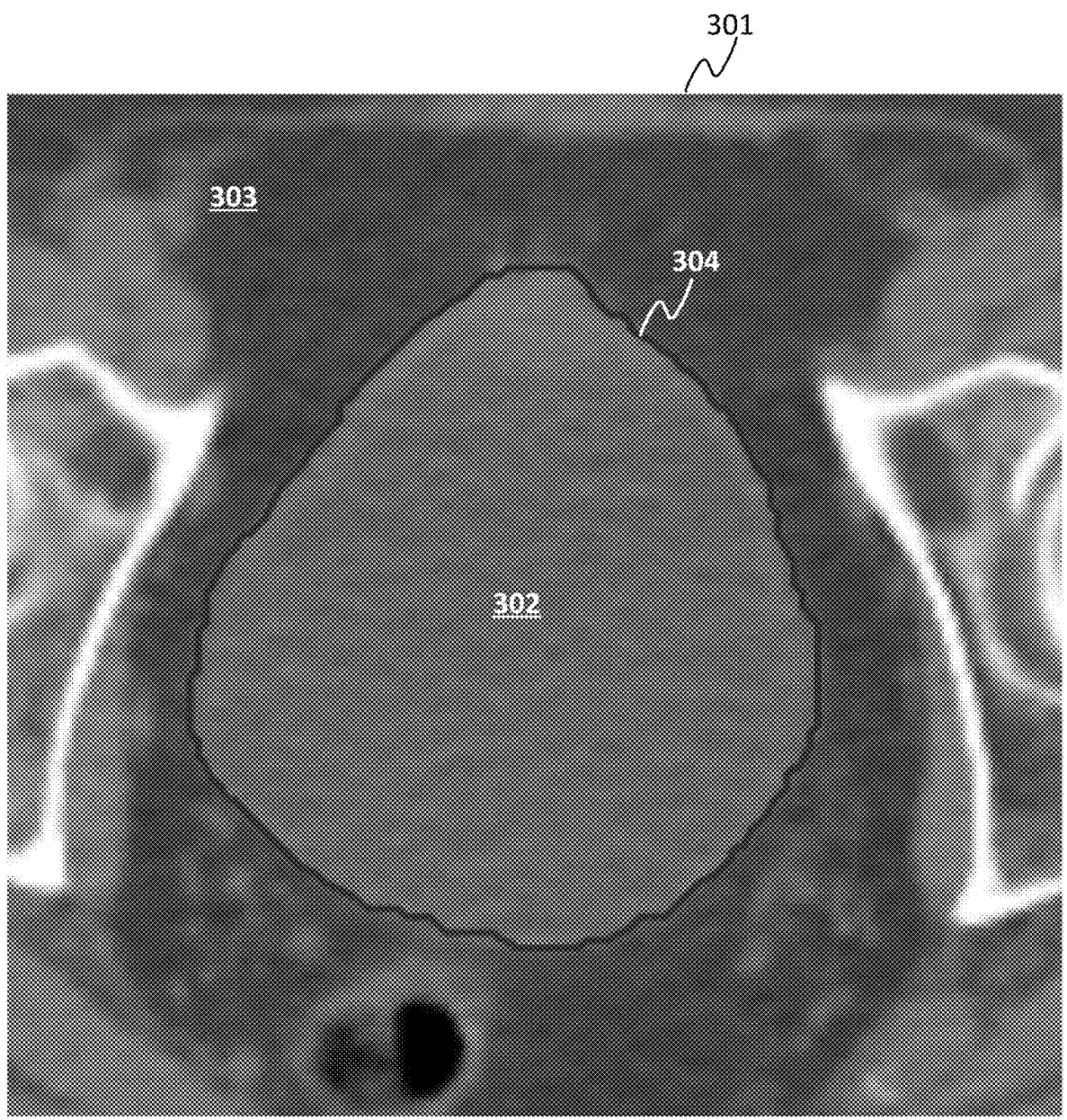

FIG. 3E shows the resulting segmentation, comprising a contour (i.e. outline) 304 that is determined automatically by the segmentation module 118 based on the classified foreground region 302, background region 303 and region of uncertainty 306. This may be determined based on geodesic distance.

To elaborate, the segmentation module automatically scans through each of a plurality of points within the region of uncertainty 305 (e.g. each pixel labelled as such in the mask). For each such point (e.g. each pixel), it computes a shortest geodesic distance to the background 303 and a shortest geodesic distance to the foreground 302. Whichever of these is shortest determines whether the uncertainty point (e.g. pixel) in question is reclassified as foreground or background: if the shortest geodesic distance to the foreground 302 is shortest it is reclassified from uncertain to foreground, but if the shortest geodesic distance to the background 303 is shortest then it is reclassified from uncertain to background.

The shortest geodesic distance from a point (e.g. pixel) in the region of uncertainty 305 to the background 303 may be determined by comparing the geodesic distances from the point to a plurality of candidate points (e.g. pixels) in the background 303 (i.e. the region already classified as known background). For the sake of efficiency it is not necessary to compare the distance to every possible point in the background 303. Note therefore that the shortest geodesic distance to the background 303, for the present purposes, means the shortest of those compared.

Similarly, the shortest geodesic distance from a point (e.g. pixel) in the region of uncertainty 305 to the foreground 302 may be determined by comparing the geodesic distances from the point to a plurality of candidate points (e.g. pixels) in the foreground 302 (i.e. the region already classified as known foreground). For the sake of efficiency it is not necessary to compare the distance to every possible point in the foreground 302. Note therefore that the shortest geodesic distance to the foreground 302, for the present purposes, means the shortest of the compared paths.

E.g. the segmentation could compare the distances only to foreground and background pixels in a limited candidate region around the region of uncertainty 306, and/or could compare the distances only to every nth pixel in the foreground or background.

The geodesic distance is a measure of distance whereby the distance is weighted by one or more parameters, such as intensity, of each point or pixel in the image along a route between the point in question and the foreground or background. The concept of geodesic distance, in itself, is known in the art.

For instance, given an image I defined on a 2D domain $\Psi$, a binary mask M (with $M(x) \in \{0, 1\} \forall x$) and foreground or background region $\Omega$ with $x \in \Omega \Longleftrightarrow M(x)=0$, the unsigned geodesic distance of each compared pixel x from $\Omega$ is defined as:

$$D(x; M, \nabla I) = \min_{\{x' | M(x')=0\}} d(x, x'), \text{ where} \quad (1)$$

$$d(a, b) = \min_{\Gamma \in P_{a,b}} \int_0^1 \sqrt{\|\Gamma'(s)\|^2 + \gamma^2 (\nabla I \cdot u)} \, ds \quad (2)$$

where x' is a pixel or point different to x; $P_{a,b}$ is the set of all considered paths between points a and b; and $\Gamma(s): \mathfrak{R} \to \mathfrak{R}^2$ indicates one such path, with $s \in [0, 1]$. The labels a and b are just different parameter names for defining d(x, x'). The two different notations are used because the above equation has two individual functions. The symbol $\nabla$ represents gradient and $\| \ldots \|$ is the magnitude. The spatial derivative $\Gamma'(s)$ is $\Gamma'(s)=\partial\Gamma(s)/\partial s$. The unit vector $u=\Gamma'(s)/\|\Gamma'(s)\|$ is tangent to the direction of the path. The factor $\gamma$ weights the contribution of the image gradient versus the spatial distances. The distance D in equation (1) reduces to the conventional Euclidean path length when $\gamma=0$.

I is a parameter representing the cost or weight of the path at each point, analogous to the height on a map. I.e. it is the property or attribute taken into account by the geodesic distance that distinguishes it from a mere linear (Euclidean) distance. In embodiments I may for example be achromatic pixel intensity (e.g. luminance). However it could be another property such as a chrominance value; or the intensity of a red, green or blue (RGB) channel. As another possibility/ could be some other technical parameter of the MRI scan, CT scan or the like, indicating a property other than what is visible in the image itself, e.g. relating to the composition of the scanned matter. In some embodiment, I could be a compound metric taking into account more than one of the above parameters. The parameter(s) or metric is/are a matter of design choice depending on the desired application.

Expressed another way, the geodesic distance may be defined as:

$$D(v) = \min \begin{cases} D(v) \\ D(v + \Delta_1) + \sqrt{\rho_{23} + \gamma(I(v) - I(v + \Delta_1))^2} \\ D(v + \Delta_2) + \sqrt{\rho_{22} + \gamma(I(v) - I(v + \Delta_2))^2} \\ D(v + \Delta_3) + \sqrt{\rho_{23} + \gamma(I(v) - I(v + \Delta_3))^2} \\ D(v + \Delta_4) + \sqrt{\rho_{22} + \gamma(I(v) - I(v + \Delta_4))^2} \\ D(v + \Delta_5) + \sqrt{\rho_{21} + \gamma(I(v) - I(v + \Delta_5))^2} \\ D(v + \Delta_6) + \sqrt{\rho_{22} + \gamma(I(v) - I(v + \Delta_6))^2} \\ D(v + \Delta_7) + \sqrt{\rho_{23} + \gamma(I(v) - I(v + \Delta_7))^2} \\ D(v + \Delta_8) + \sqrt{\rho_{22} + \gamma(I(v) - I(v + \Delta_8))^2} \\ D(v + \Delta_9) + \sqrt{\rho_{23} + \gamma(I(v) - I(v + \Delta_9))^2} \\ D(v + \Delta_{10}) + \sqrt{\rho_{12} + \gamma(I(v) - I(v + \Delta_{10}))^2} \\ D(v + \Delta_{11}) + \sqrt{\rho_{11} + \gamma(I(v) - I(v + \Delta_{11}))^2} \\ D(v + \Delta_{12}) + \sqrt{\rho_{12} + \gamma(I(v) - I(v + \Delta_{12}))^2} \\ D(v + \Delta_{13}) + \sqrt{\rho_{11} + \gamma(I(v) - I(v + \Delta_{13}))^2} \end{cases} \quad (3)$$

where v is a pixel or point in the image, and p is a spacing scale for that direction. Regarding $\rho$, the reason for this is that if the image voxels are not squares, e.g. as in some medical images, then the spacing scale for a given direction is incorporated into the distance calculation to take account of this. For instance this may be implemented as follows.

```
private void CalculateSpacingScale<T>(Volume3D<T> volume)
{
    var zRatioSquared = volume.SpacingZ * volume.SpacingZ;
    _row11DistanceScale = volume.SpacingX * volume.SpacingX;
    _row12DistanceScale = row11DistanceScale * 2;
    _row21DistanceScale = zRatioSquared;
    _row22DistanceScale = zRatioSquared + _row11DistanceScale;
    _row23DistanceScale = zRatioSquared + _row12DistanceScale;
}
```

For avoidance of doubt, the property/is of course taken from the image "underneath" or without the visible UI overlay of the trail of the region of uncertainty 306 as shown to the user in FIGS. 3C and 3D for example. This is just a graphical UI element to show the user where the region of uncertainty 306 is being painted. The graphical UI representation of the region of uncertainty 306 does not form part of the pixel values processed for determining the segmentation. Only the underlying pixel mask or classification mapped to the region of uncertainty is used in that computation.

Once the segmentation module 118 has reclassified all the processed points (e.g. every pixel) in the region of uncertainty 305 as either foreground of background, it can thus determine the contour (outline) 304 around the foreground object 302. If every pixel is reclassified, the contour 403 may simply be the outermost pixels of the foreground object 302 or the innermost pixels of the background region 303, or potentially a fit between the foreground and background regions 302, 303 (the contour 304 could be defined with a sub-pixel accuracy with each pixel being foreground or background depending on whether the majority of the area of that pixel falls inside or outside the foreground). If on the other hand the geodesic distance comparison was only performed for points representing a subset of the pixels in the region of uncertainty 305, then the contour 304 may be determined as a best fit between the processed points.

The method described with reference to FIGS. 3A to 3E thus provides a semi-automated process for segmenting an image. Note that this is only one example of a method of segmenting an image. In other embodiments, the initial segmentation to determine the contour 304 may be performed in a fully automated manner using an object recognition algorithm, e.g. as disclosed in U.S. Pat. No. 10,235, 605. In other embodiments, the initial segmentation may be performed in a fully manual manner, e.g. by the user using a manual line drawing tool (a point like tool rather than a brush tool having a finite width or area).

By whatever means the segmenting is performed, the initial contour 304 may not turn out exactly as desired. Either the automated process or the automated part of the semi-automated process may not work properly, or the user may make a manual mistake in the fully manual method or the manual part of the semi-automated process.

There are a number of possible UI tools for refining a contour around an image, e.g. at steps 210-214. The refinement may be implemented by the refinement module 120 based on inputs received through the user input equipment 108 using a UI tool provided by the UI module 116.

Figure 4:
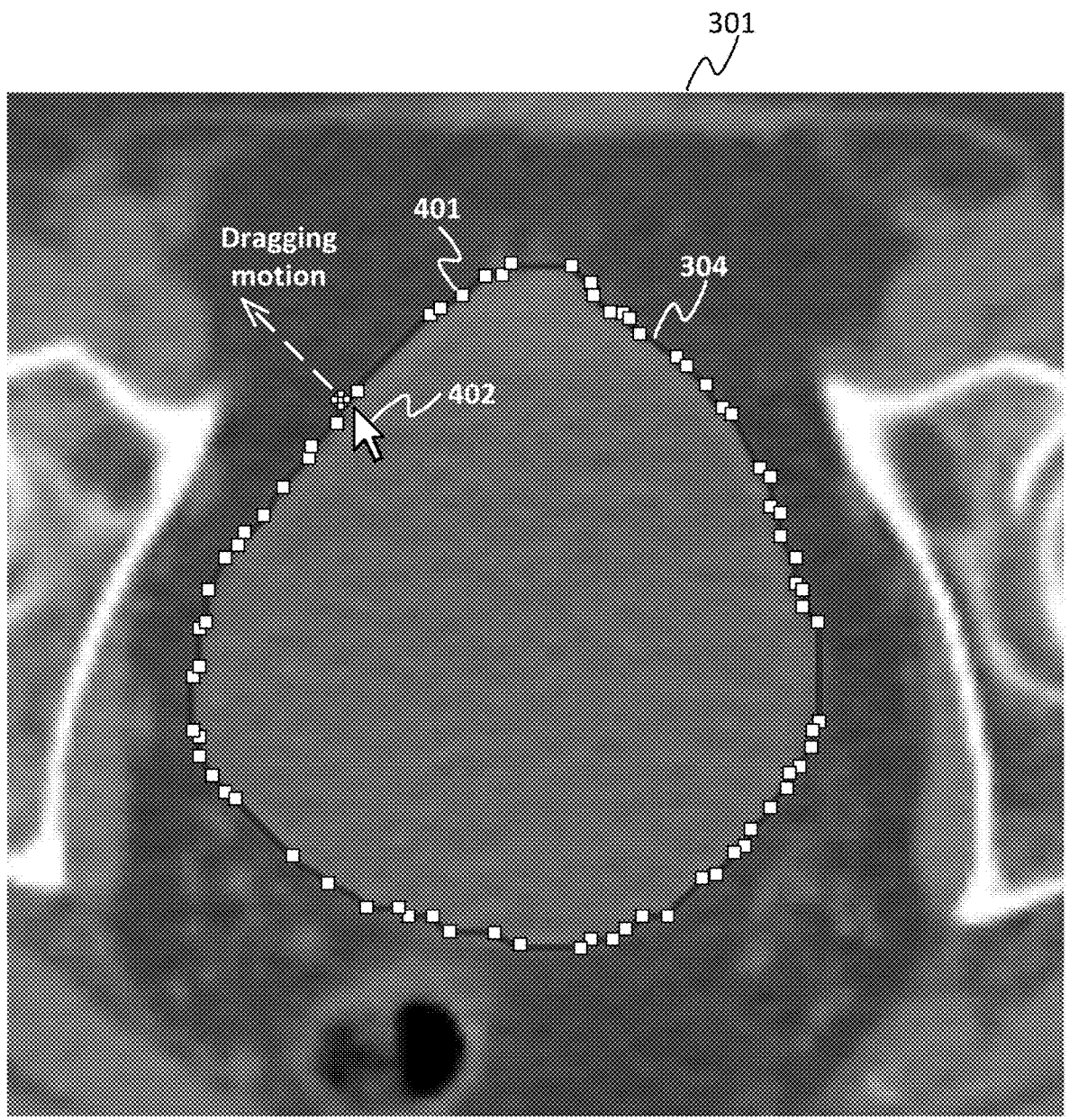
FIGS. 4 to 9 illustrate example tools for refining the segmentation of an image.

FIG. 4 shows one example tool. Here the contour 304 takes the form of a polygon and a set of nodes 401 are rendered around the contour 304 at the vertices of the polygon. The user can then use a mouse pointer tool 402 to click-and-drag the nodes 401 in order to drag in or out the corresponding verifies of the polygon.

Figure 5:
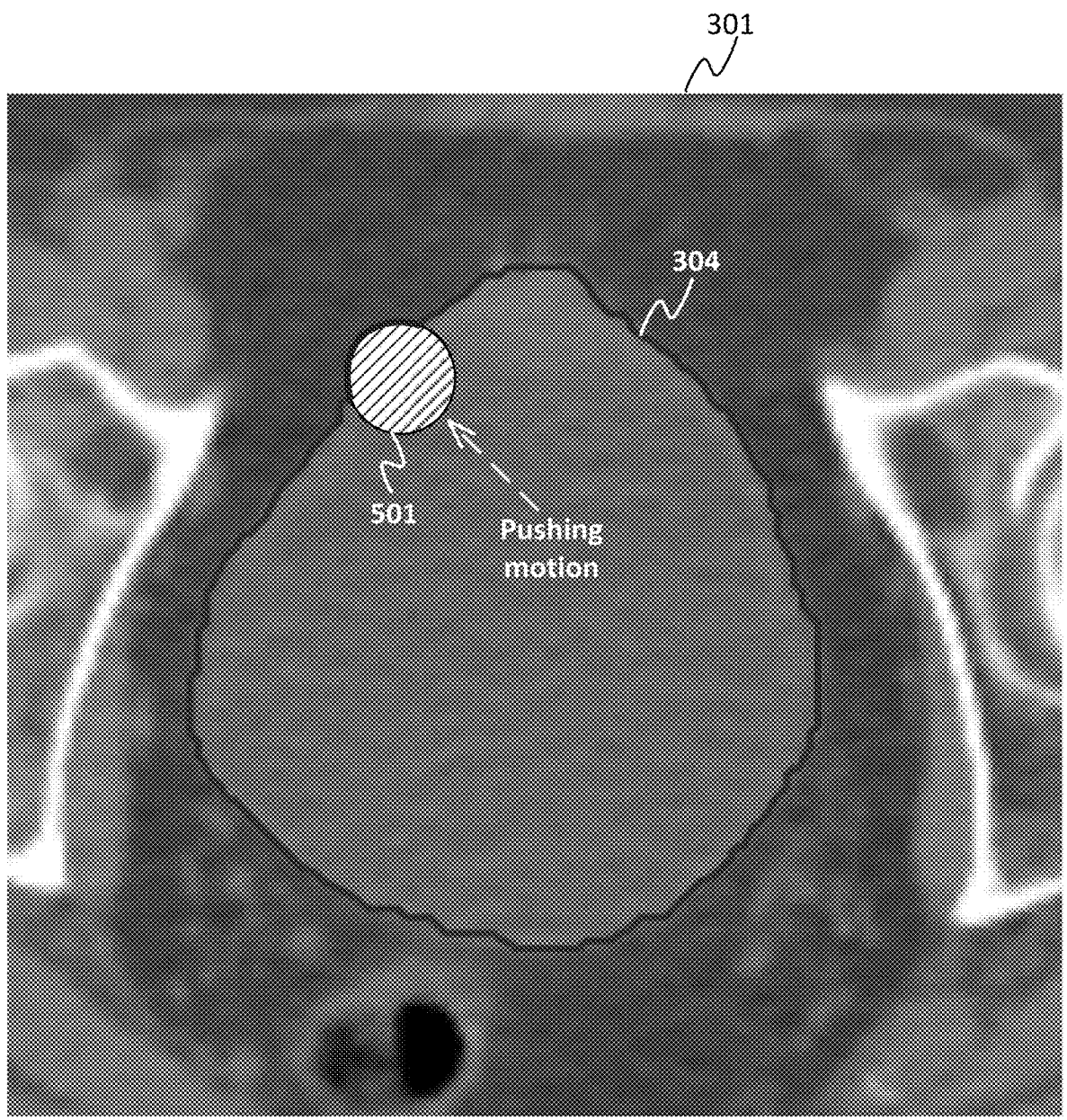

FIG. 5 shows another possible tool. Here the user is provide with a pushing tool 501. The user uses a user input device such as a mouse or stylus to place the pushing tool inside the object or foreground (within the contour 403), and then uses the tool 501 to push outwards on the contour. The contour 304 gets extended outward with the user's pushing motion.

Figure 6:
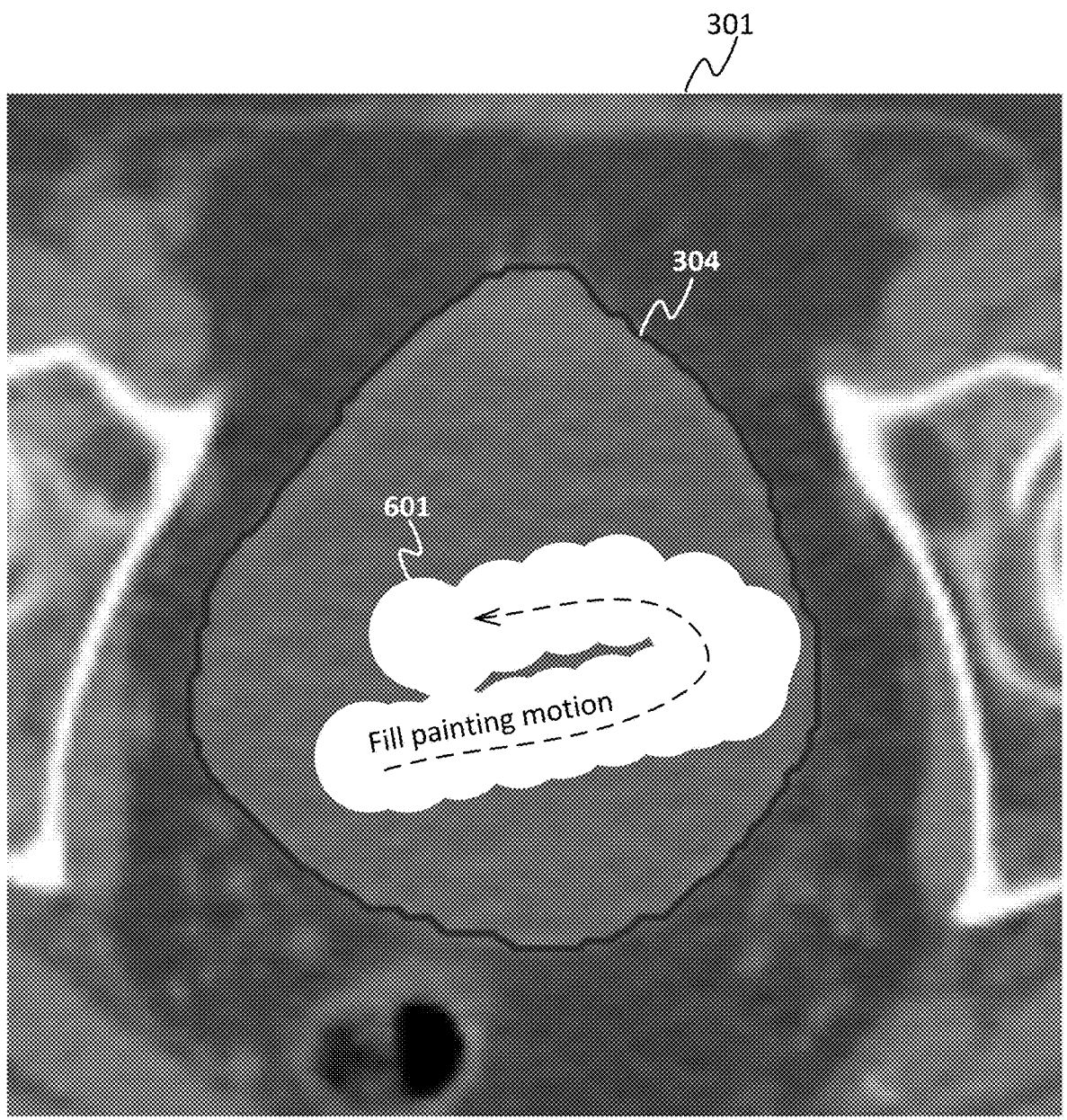

FIG. 6 shows another possible tool. Here the user uses a paint brush tool 601 to repaint the entire foreground region. The new foreground 302 then becomes simply whatever region the user painted, and the new contour 304 is simply the outline around the user's newly painted region.

Figure 7:
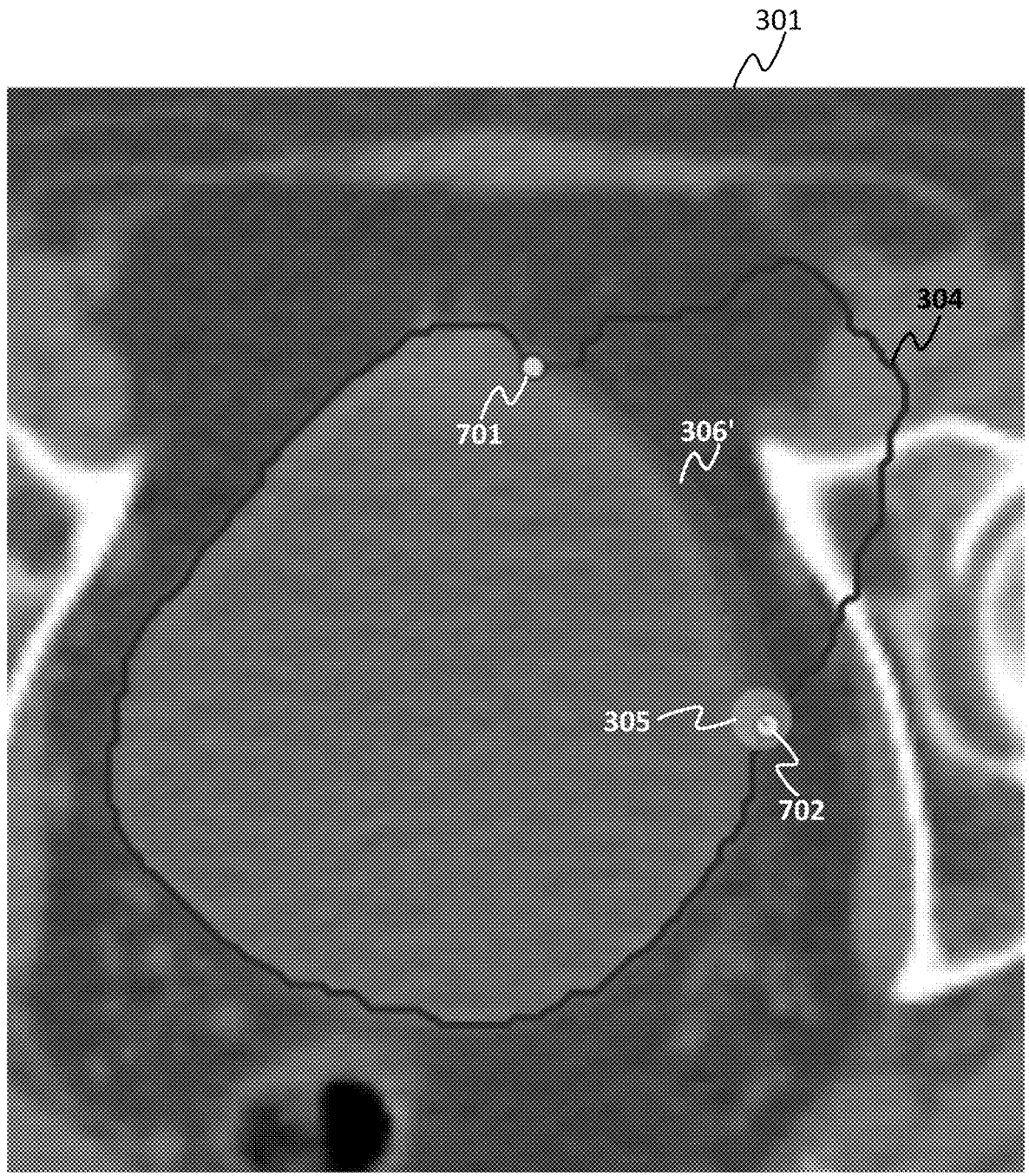

FIG. 7 illustrates the operation of a yet another possible refinement tool. For the sake of illustration, consider a scenario where the initial segmentation 206 performed by the segmentation module 118 resulted in the erroneous contour 304 shown in FIG. 7, rather than the correct one shown in FIG. 3E. The disclosed tool enables the user to correct this, e.g. to get the contour as shown in FIG. 3E, by drawing on the image and thus defining a user drawn-line defined in an at least partially manual fashion, to replace part of the initial contour. The user draws between a start point 701 and an end point 702, and thus defines a line to replace a segment of the existing contour 304.

In embodiments, the user does this by using a brush tool to brush a new region of uncertainty 306' between the start point 701 and end point 702. Advantageously, in certain embodiments this may be the same brush tool 305 that was used to perform the initial segmentation 206. The method thus provides an efficient and intuitive way to correct the segmentation. The process then works exactly as described previously in relation to FIGS. 3A-E, but processing points (e.g. every pixel) within only the newly brushed-on region of uncertainty 306' around only part of the perimeter of the object 302, rather than the full perimeter as in FIG. 3D. Once the user has brushed on this region 306', the points (e.g. every pixel) within the new region of uncertainty 306' are reclassified as uncertain. Points not in this new region of uncertainty 306' retain their initial classification as either known foreground or background from the initial segmentation step 206. In embodiments this may comprise defining a new pixel mask for the image, in which the pixels in the new region of uncertainty 306' are relabelled with the third value representing uncertainty, but the other pixels stay labelled with their previous first or second values (e.g. 0 and 1) representing known background and foreground. Note therefore that points or pixels that were previously classified as "known" foreground or background (for the purpose of the initial segmentation 206) may now be reclassified as uncertain.

The refinement module 120 may then use the same or a similar geodesic distance algorithm to reclassify the points or pixels under consideration in the new region of uncertainty 306' as foreground or background again. I.e. it scans through each point under consideration (e.g. every pixel), and for each determines a shortest geodesic distance to the known foreground 302 (according to the current mask or classification) and a shortest geodesic distance to the known background 302 (again according to the current mask or classification). If the shortest geodesic distance to the foreground 302 is shorter than the shortest geodesic distance to the background 303, then the point/pixel in question is classified as foreground; whereas if the other way around, the point/pixel in question is classified as background.

In practice, the refinement module 120 may comprise some of the same code as the segmentation module 118, and it will be appreciated that the diagram shown in FIG. 1 is somewhat schematized.

Considering the example of FIG. 7 by way of illustration, note that a "user-drawn line" does not necessarily mean that the line is drawn completely manually. Rather, in embodiments, it is drawn in a partially manual manner where the user uses a brush with a non-pointlike width or area to draw a wider region 306' encompassing the area where the new line will be determined, and the new line is then automatically determined by the refinement module 120 within the region 306' drawn by the user.

Nonetheless, in other embodiments, it is not excluded that the new line replacing part of the initial contour 304 could be drawn completely manually using a point-like drawing tool (as opposed to a brush).

Figure 8:
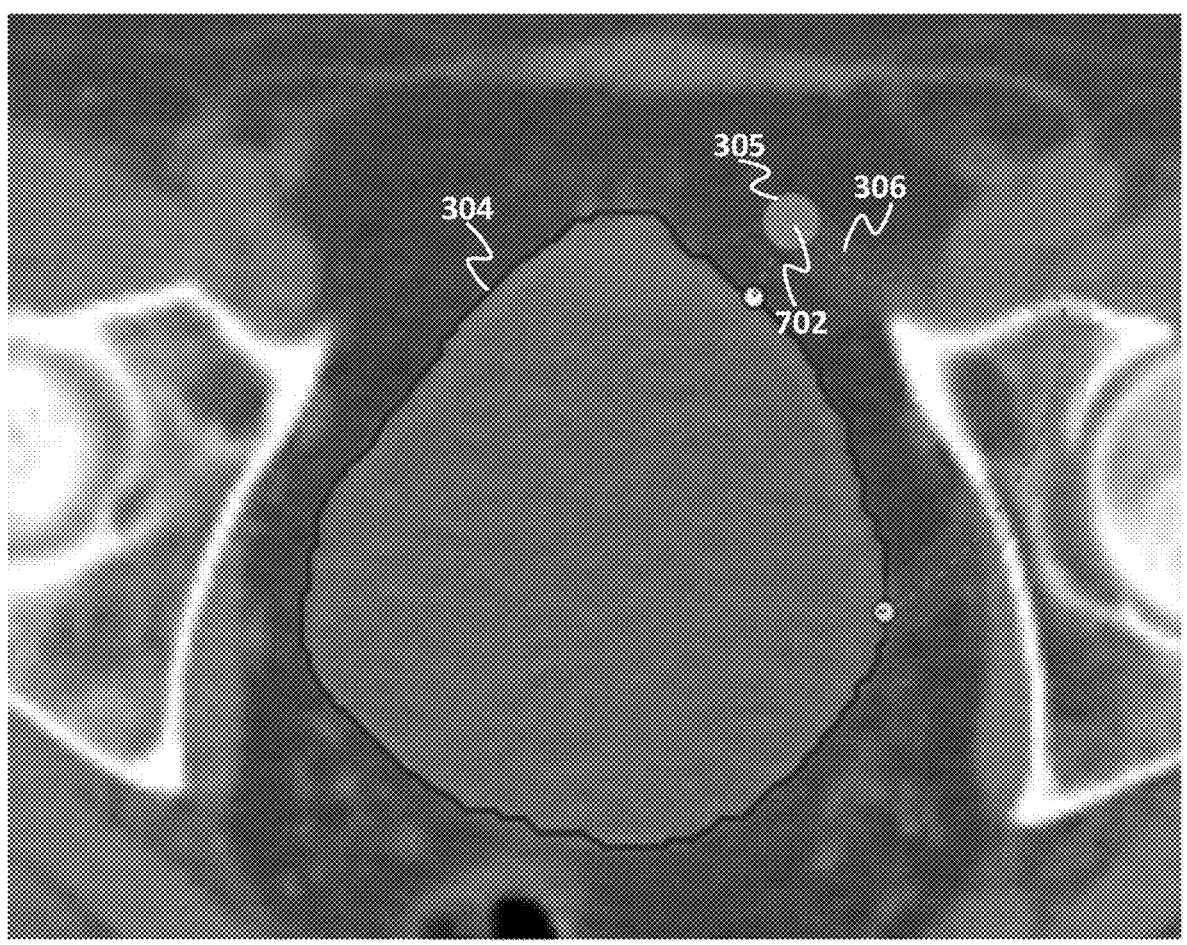

In embodiments, the user starts on the edge of an existing contour 304. The user then will "brush" to an arbitrary point on the image. The end point 702 does not need to be a point on the existing contour 304, however. Instead a line may be automatically calculated from the end point 702 of the user interaction to the closest point on the contour the user has been interacting with. For instance this may be calculated by computing the distance from the end user interaction point to each point on the contour, e.g. the direct linear distance based on Pythagoras' theorem $(x^2+y^2=z^2)$, as opposed to geodesic distance. FIG. 8 demonstrates an end point not on the contour but joining up to the closest point.

As computing the closest point on the contour to the end point can be computational expensive, embodiments may optionally employ one or more efficiencies to improve performance. A first of these is not calculating the square root of the results, and instead ordering distances by $x^2+y^2$. The closest point will be the smallest result regardless of square root. A second possibly efficient is to not compute every point on the contour to the end point, but skipping a number of points based on the size of the contour. This will result in an approximation of the closest point, but the larger the contour size, the less this approximation will affect the result.

In a variant of the above, the distance from the user's endpoint to the contour 304 could instead be determined based on geodesic distance. In this case the line connecting the user's endpoint to the initial contour 304 would be the shortest geodesic distance from the user's endpoint to the initial contour.

In embodiments the user is constrained to starting the user-drawn line at a point 701 on the initial contour 304 as determined by the segmentation module 118 at step 206. Alternatively a similar technique as described above could be used to allow the user's start point 701 to start away from the initial contour 304, as well as the endpoint 702. In other embodiments, the user's start point could be allowed to start away from the initial contour but the endpoint may be constrained to ending on the initial contour, or the user could be constrained to both starting and ending on the initial contour.

The refinement module 120 determines a refined line segment that replaces part (but not all) of the initial contour 304 that was determined by the segmentation module 118 in the initial segmentation step 206. As described, the refined, replacement line segment may consist of only a user-drawn line, or it may be made up of both a user-drawn line and one or more automatically-generated connecting lines connecting between the start and/or endpoints of the user's line and the initial contour 304.

The refinement module 120 may also reclassify which region of the image is classified as foreground object 302 and which is the background image 303.

Note that the scenario shown in FIG. 7 in fact has two possible solutions: in principle, the user could have intended to keep the loop or lobe in the upper left, and classify this smaller region as foreground; excluding the larger line around the bladder and classifying the larger, bladder region as background. Whereas of course in practice the user intended to keep the larger loop around the bladder as the contour 304 and classify the region within this, the bladder 302, as foreground; excluding the smaller, erroneous loop in the top right and classifying this area as background 303 along with the rest of the border areas of the image. There are a variety of ways the refinement module 120 may be configured to deal with this potential ambiguity.

In embodiments, the refinement module 120 could simply be configured to determine both solutions and present both to the user. As a variant of this, the refinement module 120 may provide the user with an option, via the UI module 116, to select which of the two solutions to accept. In other embodiments the refinement module 120 may be configured to automatically select between the two possible solutions. In such embodiments, the refinement module 120 may provide the user with an option, via the UI module 116, to switch to the other solution if the automatically-selected solution was not what was intended by the user.

As one possible way for the refinement module to make an automatic selection 120 is to compute and compare the foreground area within the new contour 304 for both solutions, and select as the intended solution the one that has the larger foreground area (or equivalently if there is only one object being segmented, compute and compare the area of the background region for both solutions and select that which has the smaller background region). As another example for making the selection, the refinement module 120 could select which solution is likely to have been intended based on a history of user interactions in the current and/or past images. For example, in the case where the initial segmentation 206 was performed in an at least partially manual fashion, the refinement module 120 could select as foreground the region that was closest to the user's originally drawn contour 304 or brushstroke in the same image. Or it could make the section based on a history of manual image segmentations and/or refinements made in previous images, e.g. using a machine learning algorithm such as a neural network. A combination of the above approaches could also be used.

The following describes an example algorithm for making the automatic selection between the two possible solutions based on area. After a start point and end point on the contour have been computed, next the algorithm calculates what the user was attempting to accomplish with the brush stroke. As discussed, this type of user interaction may be ambiguous to a computer algorithm, and therefore in such embodiments, the algorithm must calculate which contour shape (i.e. outline) is expected by computing two sets of possible contours. The first contour starts from either of the brush interaction start or end points. The algorithm then walks the edge of the contour in a clockwise direction to either the start or end brush interaction point. The other possible contour begins at the same point, but walks the edge of the contour in an anti-clockwise direction until it reaches the same end point.

Figure 9:
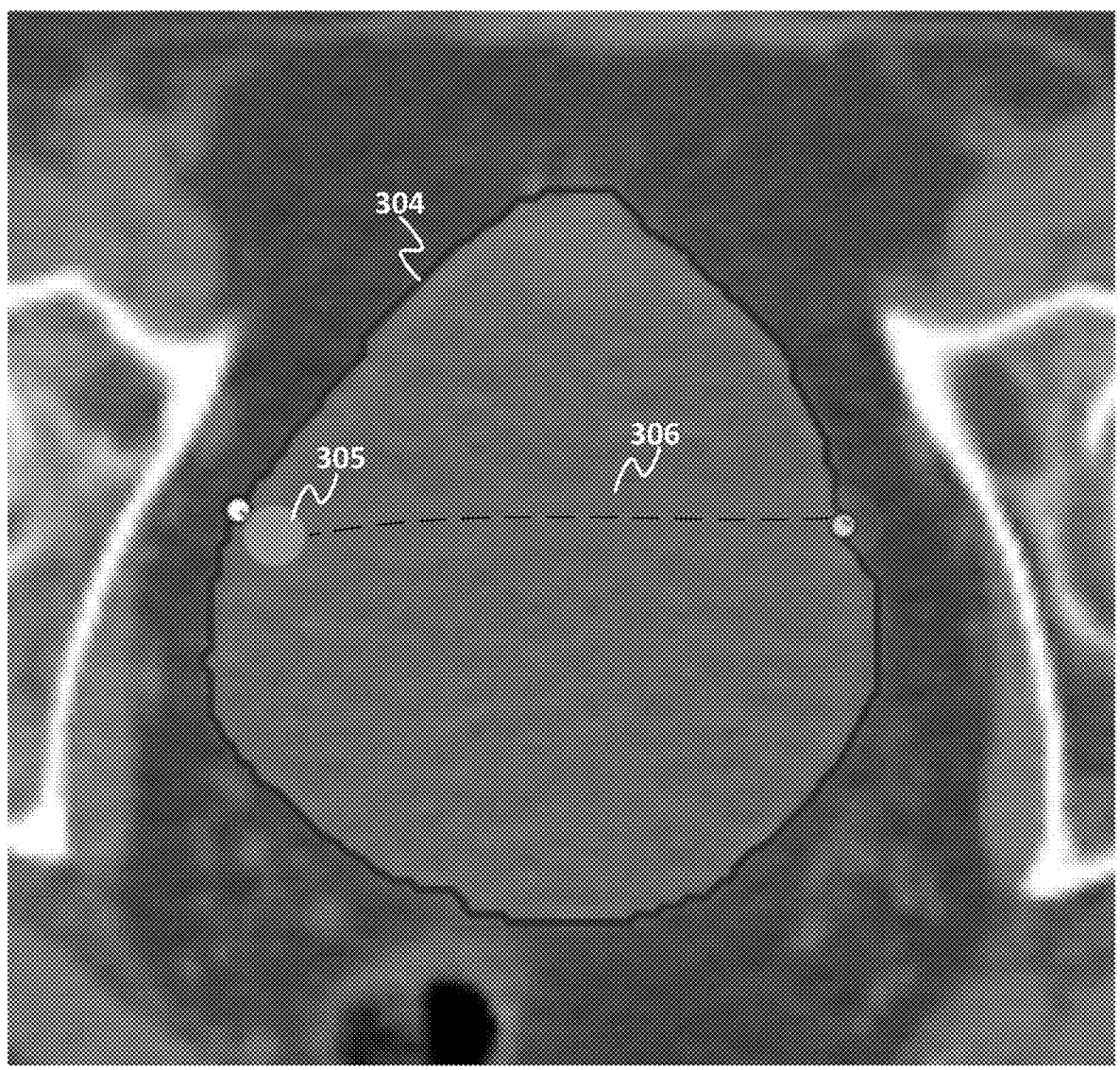

Once the two contours have been created, the algorithm calculates the size of each computed area within the contour by counting the number of pixels or voxels within each closed contour. The resulting segmentation is selected as the largest of these two areas. This works for many different use cases, some that are very ambiguous even when the user intended a specific behaviour (such as drawing a line in the middle of an existing contour as shown in FIG. 9).

A minor edge case is also introduced in this algorithm when the start and end point are the same (or within x pixels or each other). In this case, the user has created a new closed contour (outline), and therefore the algorithm assumes this was the expected shape. In this case, the algorithm first calculates whether all the interaction points exist completely within the existing segmentation. If true, the existing segmentation is replaced entirely with the result of the new interaction. If some or all points exist outside of the existing contour, the algorithm assumes the user is appending to the existing contour. Therefore, both contours are merged together, and a new contour is extracted from the outer region of the merged result.

Regardless of any particular tool that may be provided for reviewing or refining a 2D image it may be desirable to provide a mechanism for segmenting a 3D image.

Figure 10:
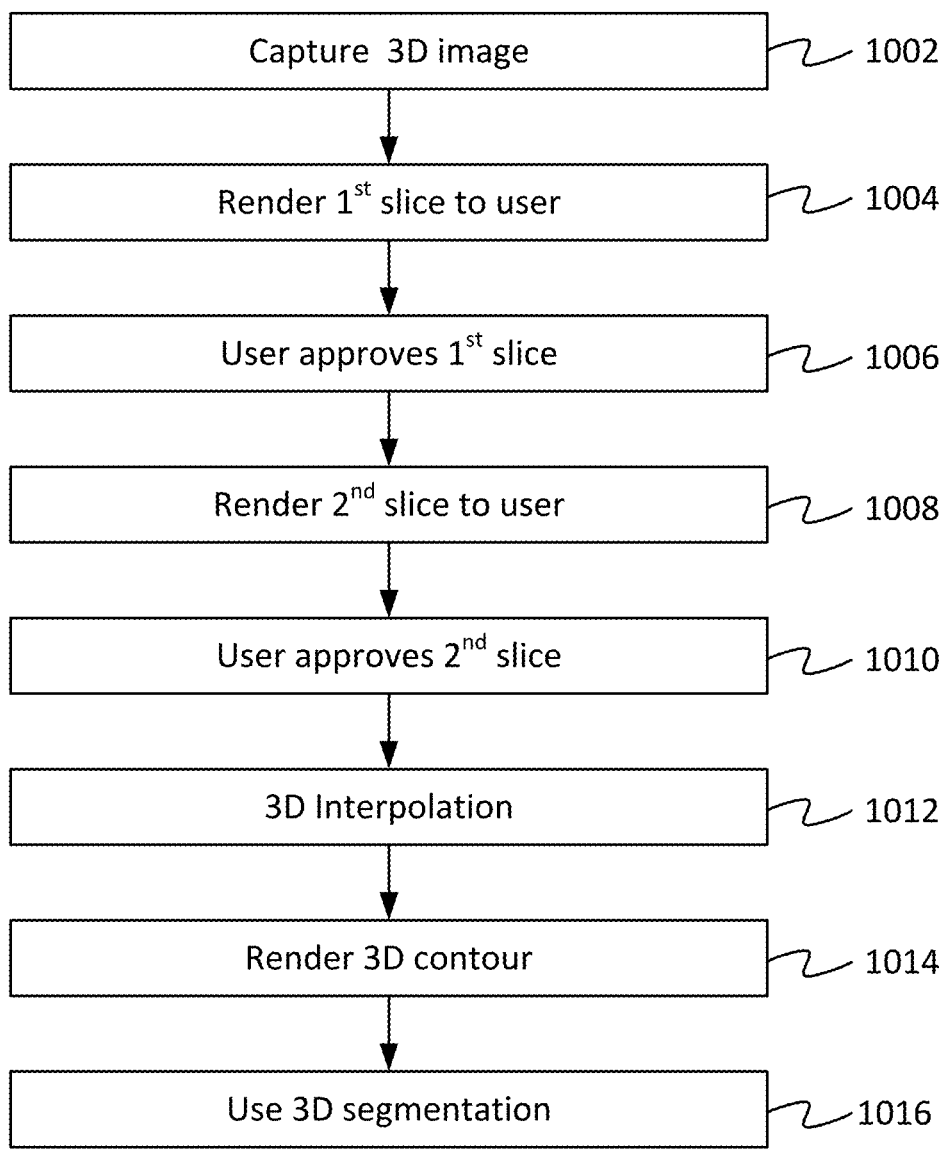
FIG. 10 is a flow chart of a method of segmenting a 3D image.

FIG. 10 shows a method of segmenting a 3D image in accordance with embodiments disclosed herein.

The method begins at step 1002 by capturing a 3D image via the image capture device 102. The 3D image comprises an ordered set of 2D images. In embodiments the 3D image takes the form of a static 3D image in which each 2D image in the set ("stack") is a different parallel slice through a volume. In an alternative use case, the 3D image could take the form of a 2D video (two spatial dimensions) in which each 2D image is a different temporal frame (the third dimension being time). By way of illustration the following will be exemplified in terms of a stack of 2D image slices forming a static 3D image, but it will be appreciated that this is not limiting. In embodiments step 1004 may comprise multiple instances of the step 202 discussed in relation to FIG. 2.

Each 2D slice of the 3D captured image is provided to the processing apparatus 104 for processing. This may comprise storing the captured image slices in memory 106, and the processing may comprise processing the stored image slices from memory 106.

At step 1004, the segmentation module 118 performs an initial segmentation of a first one of the 2D image slices in the stack, to segment it into at least one foreground object and a background region. The rendering module 114 renders the first image slice to the user through the display device 110 along with the contour. In embodiments step 1004 may comprise a first instance of steps 204 to 208 from FIG. 2, and/or the segmentation of FIGS. 3A-E, performed for the first image slice.

At step 1006 the user reviews the contour that was determined at step 1004, and decides whether to approve it or not. If the contour is already acceptable to the user, the user may simply select to approve it via the UI module 116, without modification. Alternatively, at this step the user may select to refine the contour an at-least-partially manual fashion. This may be conducted by any of the means discussed previously in relation to FIGS. 4 to 9. Once refined to the user's satisfaction, the user then selects to approve the refined contour via the UI module 116 and user input equipment 108. In embodiments step 1006 may comprise a first instance of steps 210-214 from FIG. 2, performed for the first 2D slice.

Once the contour in the slice is approved by the user, the slice (including its contour) may be described herein as "locked" or "locked in". In embodiments, this means that all the points available for processing (e.g. all pixels) in the slice are now classified as either known foreground or know background (none is classified as uncertain).

At step 1008, the segmentation module 118 performs an initial segmentation of a second one of the 2D image slices in the stack, to segment it into at least one foreground object and a background region. The rendering module 114 renders the first image slice to the user through the display device 110 along with the contour. In embodiments step 1004 may comprise a second instance of steps 204 to 208 from FIG. 2, and/or the segmentation of FIGS. 3A-E, performed for the first image slice. The second image slice is non-contiguous in the stack with the first image slice, i.e. there are one or more intermediate slices in between the first and second slices in the order in which the slices appear in the stack.

At step 1010 the user reviews the contour that was determined at step 1006, and decides whether to approve it or not. If the contour in the second slice is already acceptable to the user, the user may simply select to approve it via the UI module 116, without modification. Alternatively, at this step the user may select to refine the second slice's contour an at-least-partially manual fashion. This may be conducted by any of the means discussed previously in relation to FIGS. 4 to 9. Once refined to the user's satisfaction, the user then selects to approve the refined contour in the second slice via the UI module 116 and user input equipment 108. In embodiments step 1006 may comprise a second instance of steps 210-214 from FIG. 2, performed for the first 2D slice.

In embodiments, the method may further comprise steps analogous to 1004-1006, or 1008-1010, performed mutatis mutandis for a third or even more images slices (but not all slices in the stack).

At step 1012, the segmentation module performs a 3D geodesic interpolation between the first and second 3D image slices in order to segment the volume in between into foreground and background, with the 3D region in which the object 302 appears classified as foreground. This will be discussed in more detail shortly with reference to FIG. 11. This may comprise determining a 3D contour around the object. In embodiments, this may also be applied mutatis mutandis between the second and third slices, etc.

At step 1014 the determined 3D contour may optionally be rendered to the user, through the display device 110, superimposed on the 3D image. E.g. see FIG. 12B.

At step 1016 the method may comprise using the segmentation for a practical application. This may comprise targeting a process on the segmented foreground object, or targeting a process away from the segmented foreground object, either in the image or in the real world. For instance if the image is a medical scan and the object is a tumour, step 1016 may comprise targeting a radiotherapy treatment on the tumour in the subject's body. Or if the object is an organ, step 1016 may comprise targeting the radiotherapy treatment away from that organ.

Figure 11:
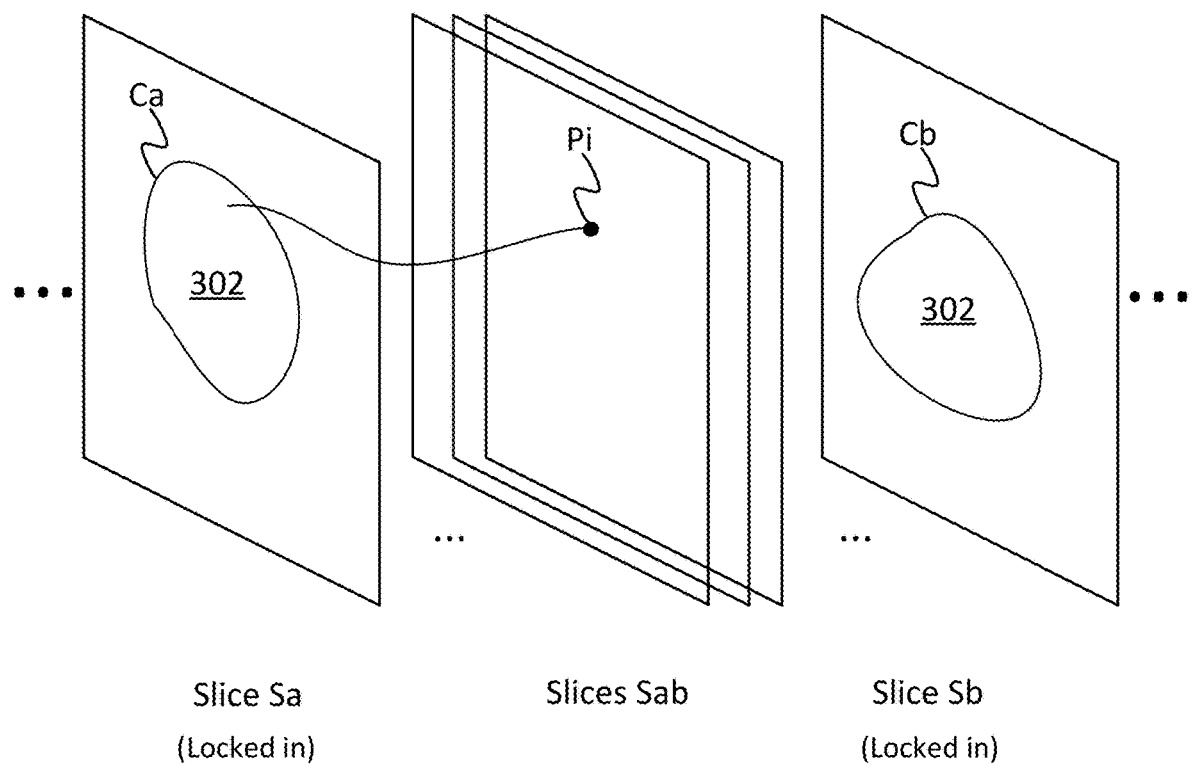
FIG. 11 is a schematic illustration of 3D interpolation between 2D image slices.

FIG. 11 illustrates the 3D geodesic interpolation as performed at step 1012. FIG. 11 shows the first 2D image slice Sa and the second 2Dimage slice Sb, with one or more intermediate slices Sab in between them in the stack. The first and second slices Sa, Sb are each locked in, i.e. approved by the user, possibly after refinement as described previously. The intermediate slices Sab form an intermediate volume or region of one or more slices that are not locked in, and in which at least part of each intermediate slice is classified as uncertain at the beginning of the 3D geodesic interpolation process. FIG. 11 also shows the contours Ca, Cb that at this stage have already been determined around the object 302 in the first and second 2D slices respectively.

As an optional optimization, prior to the 3G geodesic interpolation, some areas of one or more of the intermediate slice(s) Sab could be pre-classified as known foreground, and/or some areas of one or more of the intermediate slice(s) Sab could be pre-classified as known background. For instance, any area in an intermediate slice that is located inside the contours Ca, Cb around the object 302 in both the first and second slices, in the plane of the images, can be pre-classified as known foreground. This could be though of like a column defined by x-y pixel coordinates (coordinates in the image plane) that are classified as foreground in both the first and second image slices. And/or similarly, any area in an intermediate slice that is located outside the contours Ca, Cb in both the first and second slices, in the plane of the images, may be pre-classified as known foreground. All other areas are classified as uncertain. Such an optimization advantageously reduces the search space for the 3D geodesic interpolation algorithm, and thus reduces the computational complexity. Alternatively it would be possible to simply begin with the whole area of each intermediate slice Sab classified as uncertain, but this would require more computational resource to search.

Either way, to perform the 3D geodesic interpolation, the algorithm then operates in a similar manner as discussed previously in relation to an individual 2D slice, but now in three dimensions instead of two. That is, it processes each of a plurality of points Pi that are initially classified as uncertain at the beginning of the search. For each such point Pi, it determines the shortest geodesic distance from the point to the currently known foreground, and the shortest geodesic distance from the point to the currently known background; and if the shortest foreground distance is shorter than the shortest background distance, the point Pi is classified as foreground, but if the shortest background distance is shorter than the shortest foreground distance, the point Pi is classified as background. However, the shortest distance could now be the distance from Pi to a point in one of the other image slices between the first and second image slices inclusive, rather than in the same image slice as in the pure 2D case. Hence this is referred to herein as the 3D geodesic distance, i.e. not constrained to a path within the same 2D image slice.

The geodesic distance is again the distance taking into account a "cost" or "weight" of one or more image properties along the path, e.g. pixel intensity. The formula is the same as in the 2D case, but now in 3D coordinates instead of 2D. Again, the geodesic distance is the distance weighted along the path between two points by the one or more parameters, such as by the pixel intensity. The analogy with the height on a map becomes more difficult to think about in the 3D case since the spatial coordinates (as opposed to the parameter) are now already in 3D. Instead one could think of the geodesic distance as the path of least resistance through a volume, where different regions of the volume have higher or lower resistance to travel than others.

In embodiments the points Pi could be every voxel classified as uncertain in the intermediate region (i.e. every uncertain pixel in each of the intimidate slices). Alternatively the points Pi could just be a smaller selection of points within the intermediate region.

Either way, once all the points Pi to be processed have been classified as either foreground or background, a 3D contour may then be generated. If every voxel was processed and so now is classified as known background or foreground, the contour may simply be the outermost voxels of the foreground object or the innermost voxels of the background region, or potentially a fit between the foreground and background regions (the contour could be defined with a sub-voxel accuracy). If on the other hand the geodesic distance comparison was only performed for only selected points representing a subset of the voxels, then the contour may be determined as a best fit between the processed points.

Figure 12A:
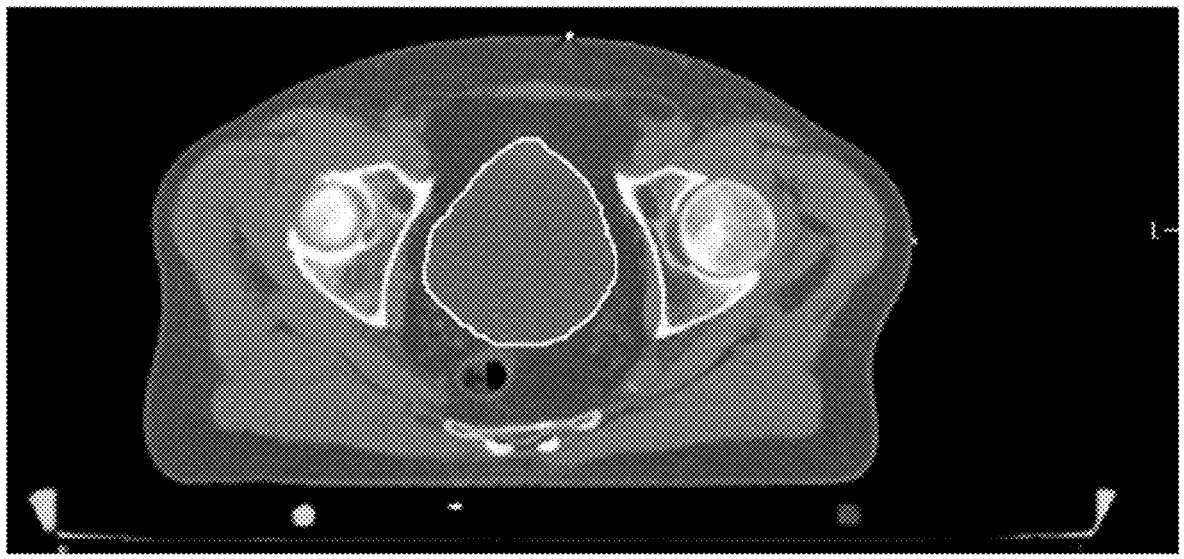
FIGS. 12A-12B illustrate an example 3D segmentation, FIG. 13 schematically illustrates independently segmenting different 3D regions.
Figure 12A:
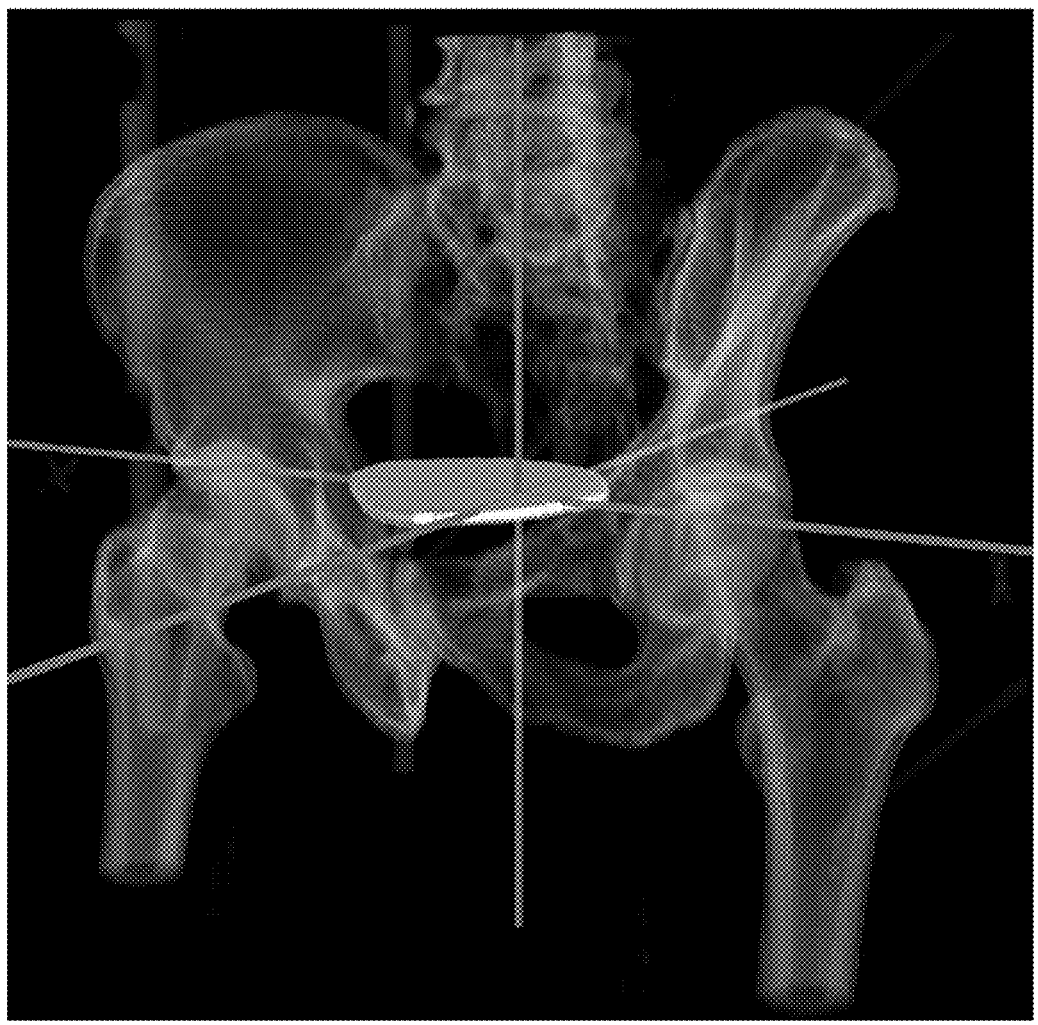
Figure 12B:
Figure 12B:
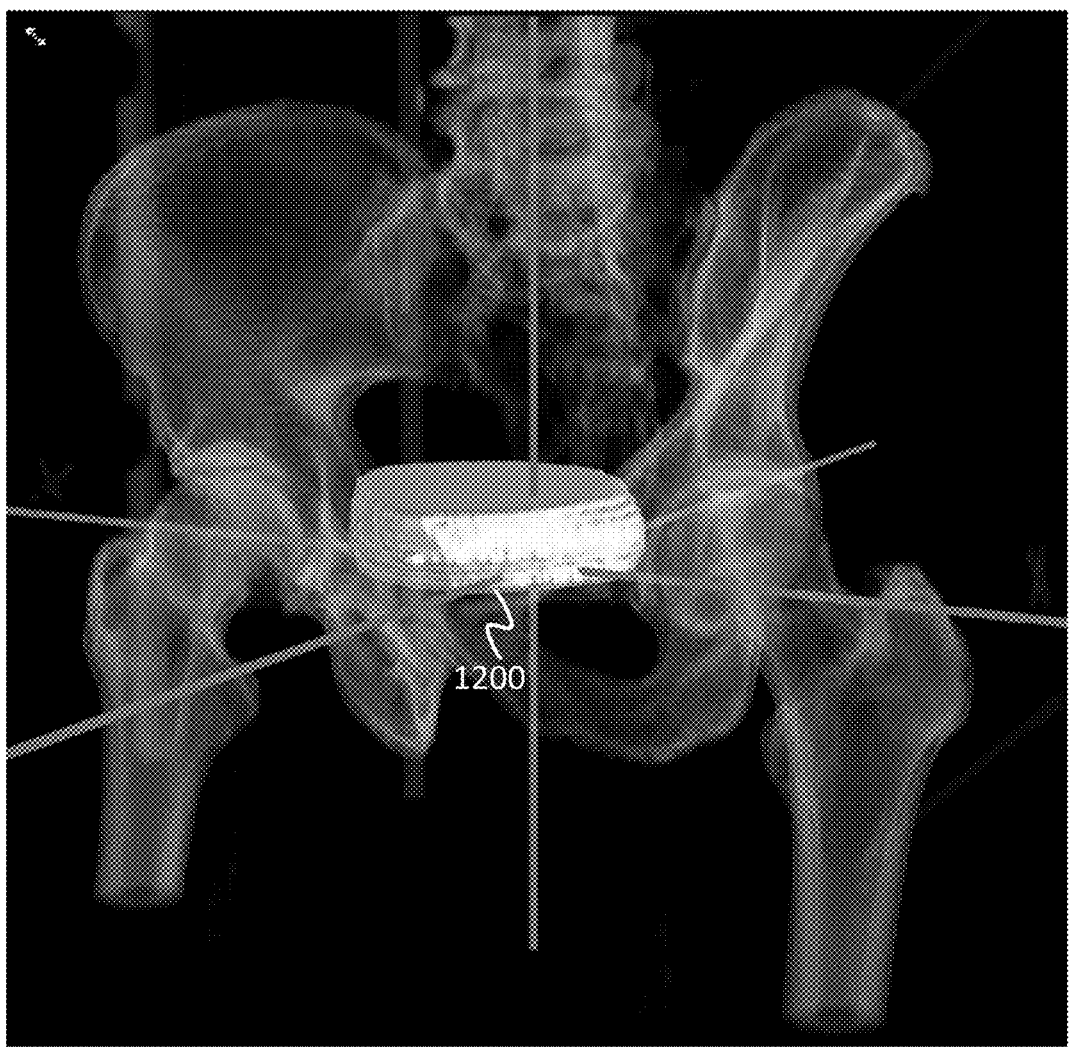

FIGS. 12A and 12B show an example where the process is used to determine a 3D volume around an organ in a medical scan, in this case a human bladder. FIG. 12A shows the first slice, and FIG. 12B shows the second slice and resulting 2D contour 1200.

Figure 13:
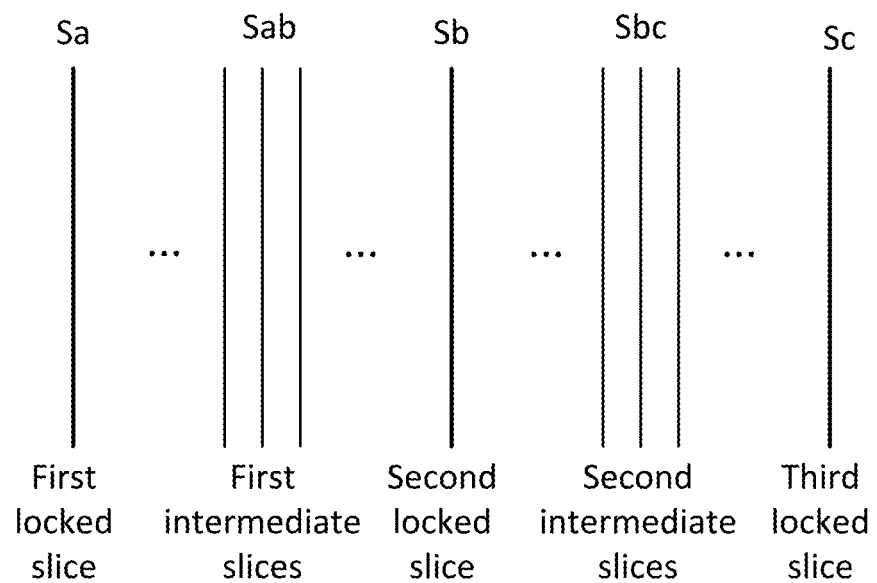

FIG. 13 illustrates a further optional optimization that may be implemented in accordance with embodiments disclosed herein. Here there are at least three slices with contours initially determined within the 2D slice: the first slice Sa, the second slice Sb, and a third slice Sc (with Sb between Sa and Sc). As will as the one or more intermediate slices Sab between the first slice Sa and second slice Sb, there are another one or more intermediate Sbc slices between the second slice Sb and third slice Sc. Each of the first, second and third slices has been locked in, in the sense that every area within each of these slices is categorized as either foreground or background. In embodiments, the 3D geodesic interpolation computation may comprise a first geodesic interpolation performed between the first and second slices Sa, Sb; and independently, a second 3D geodesic interpolation between the second and third slices Sb, Sc independently of the first 3D geodesic interpolation. This means that in the first 3D geodesic distance computation, when computing the shortest geodesic distance between Pi and the foreground and background, the possible foreground and background points at which the path from Pi terminates are constrained to being points between the first and second image slices inclusive (so out as far as the first or second slice but not beyond). Similarly, in the second 3D geodesic distance computation, when computing the shortest geodesic distance between Pi and the foreground and background, the possible foreground and background points at which the path from Pi terminates are constrained to being points between the second and third image slices inclusive.

In some such embodiments the segmentation module 118 may be configured to automatically select the pairs of slices between which to perform the independent 3D geodesic interpolation operations. To do this, preferably it will automatically select pairs of locked-in slices that are closest to one another in the order of the stack. In other words, each pair consists of one of the locked-in slices and the next closest locked-in slice along in the stack. So referring to FIG. 13, starting with Sa, the next closest locked-in slice is Sb, so Sa and Sb are automatically selected as a pair. Then the next closest slice along from Sb in the same direction through the stack is Sc, so Sb and Sc are selected as another pair, and so forth. Put another way, the pairs are adjacent (neighbouring) locked-in slices within the order of the stack, amongst those that are locked in (but still being non-contiguous with one another in the stack, i.e. there being one or more non-locked slices in between the two locked slices of each given pair).

If the user subsequently modifies the contour in one of the slices, then only the one or two independent 3D regions affected by that modification will be recomputed. So say the user subsequently modifies the third slice Sc (which had been previously "locked in"). The algorithm will re-compute the 3D segmentation between the second and third slices Sb, Sc, by performing the 3D geodesic distance computation just between those two slices; but it will not re-compute the 3D segmentation between the first and second slices. If there is a fourth slice after the third, it will re-compute between the third and fourth. But if there is a fifth slice after the fourth, it will not re-compute between the fourth and fifth.

Figure 14:
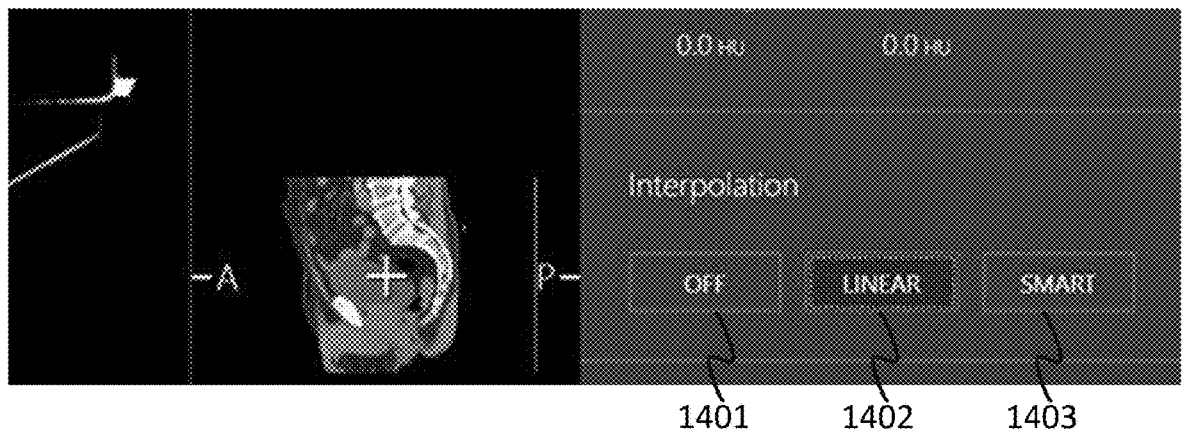
FIG. 14 shows user interface options for switching between interpolation modes.

In yet another optional feature, shown by way of example in FIG. 14, the user may be provided with an option to switch between linear and geodesic 3D interpolation. The UI module 116 presents to the user, e.g. via the display 110, a plurality of UI options (UI controls) which can be selected by the user. These may comprise a UI control 1402 for selecting linear 3D interpolation and another UI control 1403 for selecting geodesic 3D interpolation ("smart" interpolation). In some cases the controls could also include a control 1401 for turning off 3D interpolation. Such UI controls 1401, 1402 and/or 1403 may for example take the form of clickable or touchable on-screen buttons, or options in a drop-down menu, etc.

If the user selects (actuates) the geodesic 3D interpolation control 1403, then the UI module 116 controls the segmentation module 118 to switch to a geodesic 3D interpolation mode in which it performs the interpolation between slices using 3D geodesic interpolation, e.g. in accordance with embodiments described above. If on the other hand the user selects (actuates) the linear 3D interpolation control 1402, then the UI module 116 controls the segmentation module 118 to switch to a linear 3D interpolation mode in which it performs the interpolation between slices in a linear fashion. This may be between the same pair or pairs of slices as in the geodesic mode. In some such embodiments, the 3D linear and geodesic interpolation controls 1402, 1403 may allow the user to switch between the performing the interpolation in the two different modes for the same set (same pair or pairs) of locked-in slices, e.g. Sa & Sb; or Sa & Sb and Sb & Sc. The rendering module 114 may be configured to switch between rendering the 3D contour on the 3D image, via the display 110, for the same set of slices in the two different modes, in response to the user sleeting the two different respective controls 1402, 1403. This way the user can compare the results of the two different types of interpolation and select the one that best matches his/her expectation (e.g. based on his/her professional experience in the case of a medical practitioner reviewing a bodily scan or such like).

Note that even in the linear 3D interpolation mode, in embodiments the 2D contours within each of the individual locked-in slices may still be determined using 2D geodesic techniques, e.g. as discuss in relation to FIGS. 3A-D and/or FIG. 7.

It will be appreciated that the above embodiments have been described by way of example only.

More generally, according to one aspect disclosed herein, there is provided a computer-implemented method comprising: receiving a 3D image including an object depicted in the image, the 3D image comprising an ordered set of 2D images; determining a contour around the object in a first of said 2D images; and determining a contour around the object in a second of said 2D images, the second 2D image being non-contiguous with the first in said ordered set, having an intermediate region comprising one or more intermediate ones of said 2D images between the first and second 2D images within said ordered set. In each of the first and second 2D images, inside of the contour is classified as foreground and outside of the contour is classified as background. The method further comprises performing a 3D geodesic distance computation comprising, for each of a plurality of points in the intermediate region: computing a shortest foreground distance being a shortest 3D geodesic distance from the point to the foreground, and computing a shortest background distance being a shortest 3D geodesic distance from the point to the background; and classifying the point as foreground if the shortest foreground distance is shorter the shortest background distance, but classifying the point as background if the shortest background distance is shorter than the shortest foreground distance.

In embodiments the method may comprise, following the classification of said plurality of points in the intermediate region, determining a 3D contour around the object in said intermediate region, by determining a contour between the points classified as foreground and the points classified as background.

In embodiments, the determining of the contour in one or both of the first and second 2D images may comprise determining the contour at least partially automatically.

In some such embodiments, the determining of the contour in one or both of the first and second 2D images may comprise determining the contour in a partially automatic manner by:
  receiving a user input defining an area of uncertainty around a perimeter of the object in the 2D image, wherein inside the area of uncertainty is classified as foreground and outside the area of uncertainty is classified as background; and
  for each of a plurality of points in the 2D image, determining a shortest 2D geodesic distance within the 2D image from the point to the foreground, determining a shortest 2D geodesic distance within the 2D image from the point to the background, and if the shortest 2D geodesic distance to the foreground is shorter than the shortest 2D geodesic distance to the background then classifying the point as foreground, but if the shortest 2D geodesic distance to the background is shorter than the shortest 2D geodesic distance to the background then classifying the point as background.

In embodiments, the determining of the contour in one or both of the first 2D images may comprise a user manually refining the contour via a UI tool.

In embodiments, the determining of the contour in one or both of the first and second 2D images may comprise displaying the contour to a user and receiving user approval to lock in the contour.

In some such embodiments, the method may comprise: receiving user approval to lock in a contour around more than two of the 2D images in said set, and automatically selecting pairs of the locked-in 2D images between which to perform instance of the 3D geodesic interpolation. Each automatically-selected pair may consist of one of the locked-in 2D images and a next closest one of the locked-in 2D images within the ordered set, said first and second 2D images being one of said pairs.

In embodiments, the method may comprise, prior to said 3D geodesic distance computation between the first and second 2D images: performing an initial classification classifying an area in each of the intermediate 2D images as being foreground on the basis of being within the contours of both the first and second 2D images in a common plane of said set of 2D images, and/or classifying an area in each of the intermediate 2D images as background on the basis of being outside the contours of both the first and second 2D images in said plane. In this case said plurality of points in the 3D geodesic distance computation are points classified as neither foreground not background in said initial classification.

In embodiments, the method may comprise: determining a contour around the object in a third of said 2D images outside of said intermediate region and being non-contiguous with the first and second regions in said ordered set, having a further intermediate region comprising one or more further intermediate ones of said 2D images between the second and third 2D images within said ordered set; and performing a further instance of the 3D geodesic distance computation between the second and third 2D images, independently of the 3D geodesic distance computation between the first and second 2D images.

In some such embodiments the method may comprise, in response to a user subsequently modifying the contour in the third 2D image, re-preforming the 3D geodesic distance computation between the second and third 2D images without re-performing the 3D geodesic distance computation between the first and second 2D images.

In embodiments, the geodesic distance may be a measure of distance weighted by at least pixel intensity along a path between the point and the foreground or background. Alternatively or additionally, it could be a measure of the distance weighted by one or more other pixel properties or image properties along the path.

In embodiments, said intermediate region may comprise an intermediate volume comprising a plurality of said 2D images between the first and second 2D images within said ordered set.

In embodiments, the method may comprise providing a user interface option enabling a user to switch between the 3D geodesic interpolation between the first and second slices, and a linear 3D interpolation between the first and second slices.

In embodiments, said 3D image may be a static 3D image of a volume, wherein each of the 2D images in said set is a different 2D slice through the volume.

For example the 3D image may comprise a scan of at least part of a body of a living being and the object is an organ or tumour within said body.

Alternatively, said 3D image may be a video image with two spatial dimensions, wherein each of the 2D images in said set is a different temporal frame.

According to another aspect disclosed herein, there is provided a computer program embodied on computer-readable storage and configured so as when run on one or more processors to perform a method according to any embodiment disclosed herein.

According to another aspect, there is provided system comprising: memory comprising one or more memory devices, and processing apparatus comprising one or more processing units; wherein the memory stores code arranged to run on the processing apparatus, the code being configured so as when run to perform a method in accordance with any embodiment disclosed herein.

Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method comprising:
   receiving a 3D image including an object depicted in the image, the 3D image comprising an ordered set of 2D images;
   determining a contour around the object in a first of said 2D images; and
   determining a contour around the object in a second of said 2D images, the second 2D image being non-contiguous with the first in said ordered set, having an intermediate region comprising one or more intermediate ones of said 2D images between the first and second 2D images within said ordered set;
   wherein in each of the first and second 2D images, inside of the contour is classified as foreground and outside of the contour is classified as background, and wherein the method further comprises:
   performing a 3D geodesic distance computation comprising, for each of a plurality of points in the intermediate region: computing a shortest foreground distance being a shortest 3D geodesic distance from the point to the foreground, and computing a shortest background distance being a shortest 3D geodesic distance from the point to the background; and classifying the point as foreground if the shortest foreground distance is shorter the shortest background distance, but classifying the point as background if the shortest background distance is shorter than the shortest foreground distance.

2. The method of claim 1, comprising, following the classification of said plurality of points in the intermediate region, determining a 3D contour around the object in said intermediate region, by determining a contour between the points classified as foreground and the points classified as background.

3. The method of claim 1, wherein the determining of the contour in one or both of the first and second 2D images comprises determining the contour at least partially automatically.

4. The method of claim 3, wherein the determining of the contour in one or both of the first and second 2D images comprises determining the contour in a partially automatic manner by:
   receiving a user input defining an area of uncertainty around a perimeter of the object in the 2D image, wherein inside the area of uncertainty is classified as foreground and outside the area of uncertainty is classified as background; and
   for each of a plurality of points in the 2D image, determining a shortest 2D geodesic distance within the 2D image from the point to the foreground, determining a shortest 2D geodesic distance within the 2D image from the point to the background, and if the shortest 2D geodesic distance to the foreground is shorter than the shortest 2D geodesic distance to the background then classifying the point as foreground, but if the shortest 2D geodesic distance to the background is shorter than the shortest 2D geodesic distance to the background then classifying the point as background.

5. The method of claim 1, wherein the determining of the contour in one or both of the first 2D images comprises a user manually refining the contour via a UI tool.

6. The method of claim 1, wherein the determining of the contour in one or both of the first and second 2D images comprises displaying the contour to a user and receiving user approval to lock in the contour.

7. The method of claim 6, comprising receiving user approval to lock in a contour around more than two of the 2D images in said set, and automatically selecting pairs of the locked-in 2D images between which to perform instance of the 3D geodesic interpolation, wherein each automatically-selected pair consists of one of the locked-in 2D images and a next closest one of the locked-in 2D images within the ordered set, said first and second 2D images being one of said pairs.

8. The method of claim 1, comprising, prior to said 3D geodesic distance computation between the first and second 2D images:
   performing an initial classification classifying an area in each of the intermediate 2D images as being foreground on the basis of being within the contours of both the first and second 2D images in a common plane of said set of 2D images, and/or classifying an area in each of the intermediate 2D images as background on the basis of being outside the contours of both the first and second 2D images in said plane, wherein said plurality of points in the 3D geodesic distance computation are points classified as neither foreground not background in said initial classification.

9. The method of claim 1, comprising:
   determining a contour around the object in a third of said 2D images outside of said intermediate region and being non-contiguous with the first and second regions in said ordered set, having a further intermediate region comprising one or more further intermediate ones of said 2D images between the second and third 2D images within said ordered set; and
   performing a further instance of the 3D geodesic distance computation between the second and third 2D images, independently of the 3D geodesic distance computation between the first and second 2D images.

10. The method of claim 9, comprising, in response to a user subsequently modifying the contour in the third 2D image, re-preforming the 3D geodesic distance computation between the second and third 2D images without re-performing the 3D geodesic distance computation between the first and second 2D images.

11. The method of claim 1, wherein the geodesic distance is a measure of distance weighted by at least pixel intensity along a path between the point and the foreground or background.

12. The method of claim 1, wherein said intermediate region comprises an intermediate volume comprising a plurality of said 2D images between the first and second 2D images within said ordered set.

13. The method of claim 1, comprising providing a user interface option enabling a user to switch between the 3D geodesic interpolation between the first and second slices, and a linear 3D interpolation between the first and second slices.

14. A computer program embodied on computer-readable storage device and configured so as when run on one or more processors to perform a method of:
   receiving a 3D image including an object depicted in the image, the 3D image comprising an ordered set of 2D images;
   determining a contour around the object in a first of said 2D images; and
   determining a contour around the object in a second of said 2D images, the second 2D image being non-contiguous with the first in said ordered set, having an intermediate region comprising one or more intermediate ones of said 2D images between the first and second 2D images within said ordered set;
   wherein in each of the first and second 2D images, inside of the contour is classified as foreground and outside of the contour is classified as background, and wherein the method further comprises:
   performing a 3D geodesic distance computation comprising, for each of a plurality of points in the intermediate region: computing a shortest foreground distance being a shortest 3D geodesic distance from the point to the foreground, and computing a shortest background distance being a shortest 3D geodesic distance from the point to the background; and classifying the point as foreground if the shortest foreground distance is shorter the shortest background distance, but classifying the point as background if the shortest background distance is shorter than the shortest foreground distance.

15. A system comprising:
   a memory comprising one or more memory devices, and
   a processing apparatus comprising one or more processing units;
   wherein the memory stores code arranged to run on the processing apparatus, the code being configured so as when run to perform a method of;
   receiving a 3D image including an object depicted in the image, the 3D image comprising an ordered set of 2D images;
   determining a contour around the object in a first of said 2D images; and
   determining a contour around the object in a second of said 2D images, the second 2D image being non-contiguous with the first in said ordered set, having an intermediate region comprising one or more intermediate ones of said 2D images between the first and second 2D images within said ordered set;
   wherein in each of the first and second 2D images, inside of the contour is classified as foreground and outside of the contour is classified as background, and wherein the method further comprises:
   performing a 3D geodesic distance computation comprising, for each of a plurality of points in the intermediate region: computing a shortest foreground distance being a shortest 3D geodesic distance from the point to the foreground, and computing a shortest background distance being a shortest 3D geodesic distance from the point to the background; and classifying the point as foreground if the shortest foreground distance is shorter the shortest background distance, but classifying the point as background if the shortest background distance is shorter than the shortest foreground distance.

* * * * *